(12) United States Patent
Fukumoto et al.

(10) Patent No.: US 12,313,292 B2
(45) Date of Patent: May 27, 2025

(54) AIR CONDITIONING SYSTEM

(71) Applicant: Panasonic Intellectual Property Management Co., Ltd., Osaka (JP)

(72) Inventors: Masahide Fukumoto, Aichi (JP); Josui Kishimoto, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 407 days.

(21) Appl. No.: 18/001,684

(22) PCT Filed: Jun. 3, 2021

(86) PCT No.: PCT/JP2021/021212
§ 371 (c)(1),
(2) Date: Dec. 13, 2022

(87) PCT Pub. No.: WO2022/004265
PCT Pub. Date: Jan. 6, 2022

(65) Prior Publication Data
US 2023/0332782 A1    Oct. 19, 2023

(30) Foreign Application Priority Data

Jun. 30, 2020 (JP) ................................. 2020-112212
Jun. 30, 2020 (JP) ................................. 2020-112214

(51) Int. Cl.
*F24F 6/16* (2006.01)
*F24F 3/14* (2006.01)
*F24F 6/00* (2006.01)

(52) U.S. Cl.
CPC ............. *F24F 6/16* (2013.01); *F24F 3/14* (2013.01); *F24F 2006/008* (2013.01)

(58) Field of Classification Search
CPC ........... F24F 3/14; F24F 6/16; F24F 2006/008
(Continued)

(56) References Cited

U.S. PATENT DOCUMENTS 1,190,386 A * 7/1916 Dickerson ................. F24F 6/06
                                                         96/365
1,439,319 A * 12/1922 Mills ......................... F24F 6/16
                                                         261/28

(Continued)

FOREIGN PATENT DOCUMENTS

JP    2001-304636 A    10/2001
JP    2002-130945 A  *  5/2002
(Continued)

OTHER PUBLICATIONS

English Machine Translation of JP 2002-130945 A (Year: 2002).*
(Continued)

*Primary Examiner* — Charles S Bushey
(74) *Attorney, Agent, or Firm* — Rimon P.C.

(57) ABSTRACT

An air conditioning system includes an air conditioning apparatus that adjusts a temperature of air in an air conditioning room, humidification apparatus that humidifies the air, and a plurality of conveyance fans that respectively conveys the air in the air conditioning room to a plurality of indoor spaces. Humidification apparatus includes rotation shaft that is rotated by rotation motor, centrifugal fan that is fixed to rotation shaft and rotates together with rotation shaft to introduce the air temperature-adjusted by the air conditioning apparatus into the humidification apparatus, cylindrical pumping pipe fixed to rotation shaft, rotates together with rotation shaft to pump up water from a pumping port, and discharges the pumped water in a centrifugal direction, first eliminator that micronizes the water discharged from pumping pipe by collision of the water and collects a part of micronized water droplets, and water storage portion storing the water pumped from pumping pipe.

4 Claims, 9 Drawing Sheets

(58) Field of Classification Search
USPC .................................. 261/28, 84, 88, DIG. 15
See application file for complete search history.

(56) References Cited

U.S. PATENT DOCUMENTS

| | | | | |
|---|---|---|---|---|
| 1,979,630 | A * | 11/1934 | Lea | F24F 6/06 |
| | | | | 261/106 |
| 2,382,502 | A * | 8/1945 | Philipp | F24F 1/0067 |
| | | | | 165/125 |
| 2,721,623 | A * | 10/1955 | Fletcher | F24F 6/06 |
| | | | | 415/199.1 |
| 2,766,027 | A * | 10/1956 | Herr | F24F 6/16 |
| | | | | 261/DIG. 15 |
| 3,290,021 | A * | 12/1966 | Blachly | F24F 6/16 |
| | | | | 415/88 |
| 3,421,745 | A * | 1/1969 | Prupis | F24F 6/06 |
| | | | | 261/DIG. 15 |
| 3,528,781 | A * | 9/1970 | Glefman et al. | B01D 47/028 |
| | | | | 422/4 |
| 4,693,854 | A * | 9/1987 | Yau | B01F 23/235 |
| | | | | 261/DIG. 26 |
| 5,147,581 | A * | 9/1992 | Lu | F24F 6/16 |
| | | | | 62/304 |
| 5,788,893 | A * | 8/1998 | Montagnino | F24F 6/16 |
| | | | | 261/91 |
| 7,527,247 | B1 * | 5/2009 | Krueger | A61L 9/14 |
| | | | | 261/88 |
| 7,896,319 | B2 * | 3/2011 | Fujii | A61H 33/063 |
| | | | | 261/78.2 |
| 2017/0342999 | A1 * | 11/2017 | Kamrath | F04D 29/22 |
| 2021/0247079 | A1 | 8/2021 | Tsubouchi et al. | |
| 2024/0318846 | A1 * | 9/2024 | Kobayashi | F24F 6/16 |

FOREIGN PATENT DOCUMENTS

| | | | |
|---|---|---|---|
| JP | 2006-057977 A | | 3/2006 |
| JP | 2006-242397 A | | 9/2006 |
| JP | 2012-002391 A | | 1/2012 |
| JP | 2015-024350 A | | 2/2015 |
| JP | 2019-027676 A | | 2/2019 |
| JP | 2019-171272 A | * | 10/2019 |
| JP | 2019-171273 A | * | 10/2019 |
| JP | 2020-063899 A | | 4/2020 |

OTHER PUBLICATIONS

English Machine Translation of JP 2019-171272 A (Year: 2019).*
English Machine Translation of JP 2019-171273 A (Year: 2019).*
International Search Report dated Jul. 6, 2021 issued in International Patent Application No. PCT/JP2021/021212, with English translation.

* cited by examiner

⇐ AIR FLOW
⇐ WATER FLOW

AIR CONDITIONING SYSTEM

CROSS-REFERENCE OF RELATED APPLICATIONS

This application is the U.S. National Phase under 35 U.S.C. § 371 of International Patent Application No. PCT/JP2021/021212, filed on Jun. 3, 2021, which in turn claims the benefit of Japanese Patent Application No. 2020-112212, filed on Jun. 30, 2020, and Japanese Patent Application No. 2020-112214, filed on Jun. 30, 2020, the entire disclosures of which Applications are incorporated by reference herein.

TECHNICAL FIELD

The present disclosure relates to an air conditioning system that conditions a plurality of spaces.

BACKGROUND ART

In the related art, an entire building air conditioning apparatus has performed air conditioning on a residence. High-heat-insulating and high-airtight residential buildings are predicted to increase along with an increase in demand for energy-saving residential buildings and tightening of regulations, and an air conditioning system suitable for the characteristics thereof is demanded.

As such an air conditioning system, an entire-building air conditioning system is known (for example, PTL 1). The entire-building air conditioning system conditions air conveyed from a plurality of spaces (rooms) or the like to an air conditioning room at a predetermined temperature and humidity in the air conditioning room and then conveys the air to the plurality of spaces or the like so that the temperatures and humidity of the air in the plurality of spaces or the like become target temperatures and humidity.

CITATION LIST

Patent Literature

PTL 1: Unexamined Japanese Patent Publication No. 2020-63899

SUMMARY OF THE INVENTION

In a conventional entire-building air conditioning system, a temperature of air in an air conditioning room is controlled by an air conditioning apparatus (air conditioner) installed in the air conditioning room. The humidity of the air in the air conditioning room is humidified and controlled by a humidification apparatus similarly installed in the air conditioning room. By dividing the space in the air conditioning room and efficiently controlling temperature adjustment and humidification adjustment in each space, downsizing of the air conditioning room is achieved. However, in the conventional entire-building air conditioning system, the configuration of the humidification apparatus has not been sufficiently studied, and thus downsizing of the air conditioning room may be further improved.

The present disclosure provides an air conditioning system using a humidification apparatus that contributes to downsizing of an air conditioning room.

An air conditioning system of the present disclosure includes an air conditioning room configured to enable air to be introduced from inside and outside, an air conditioning apparatus that is installed in the air conditioning room and adjusts a temperature of air in the air conditioning room, a humidification apparatus that is installed in the air conditioning room and humidifies the air temperature-adjusted by the air conditioning apparatus, and a plurality of conveyance fans that conveys the air in the air conditioning room to a respective one of a plurality of indoor spaces independent of the air conditioning room. The humidification apparatus includes a rotation shaft that is rotated by a rotation motor, a centrifugal fan that is fixed to the rotation shaft and rotates together with the rotation shaft to introduce air temperature-adjusted by the air conditioning apparatus into the humidification apparatus, a cylindrical pumping pipe that has a pumping port on a vertically lower side, is fixed to the rotation shaft, rotates together with the rotation shaft to pump up water from the pumping port, and discharges the pumped water in a centrifugal direction, an eliminator that micronizes the water by collision of the water discharged from the pumping pipe and collects a part of micronized water droplets, and a water storage portion that is provided below the pumping pipe in a vertical direction and stores the water pumped from the pumping port.

The present disclosure can provide an air conditioning system using a humidification apparatus that contributes to downsizing of an air conditioning room.

DESCRIPTION OF EMBODIMENTS

Figure 1:
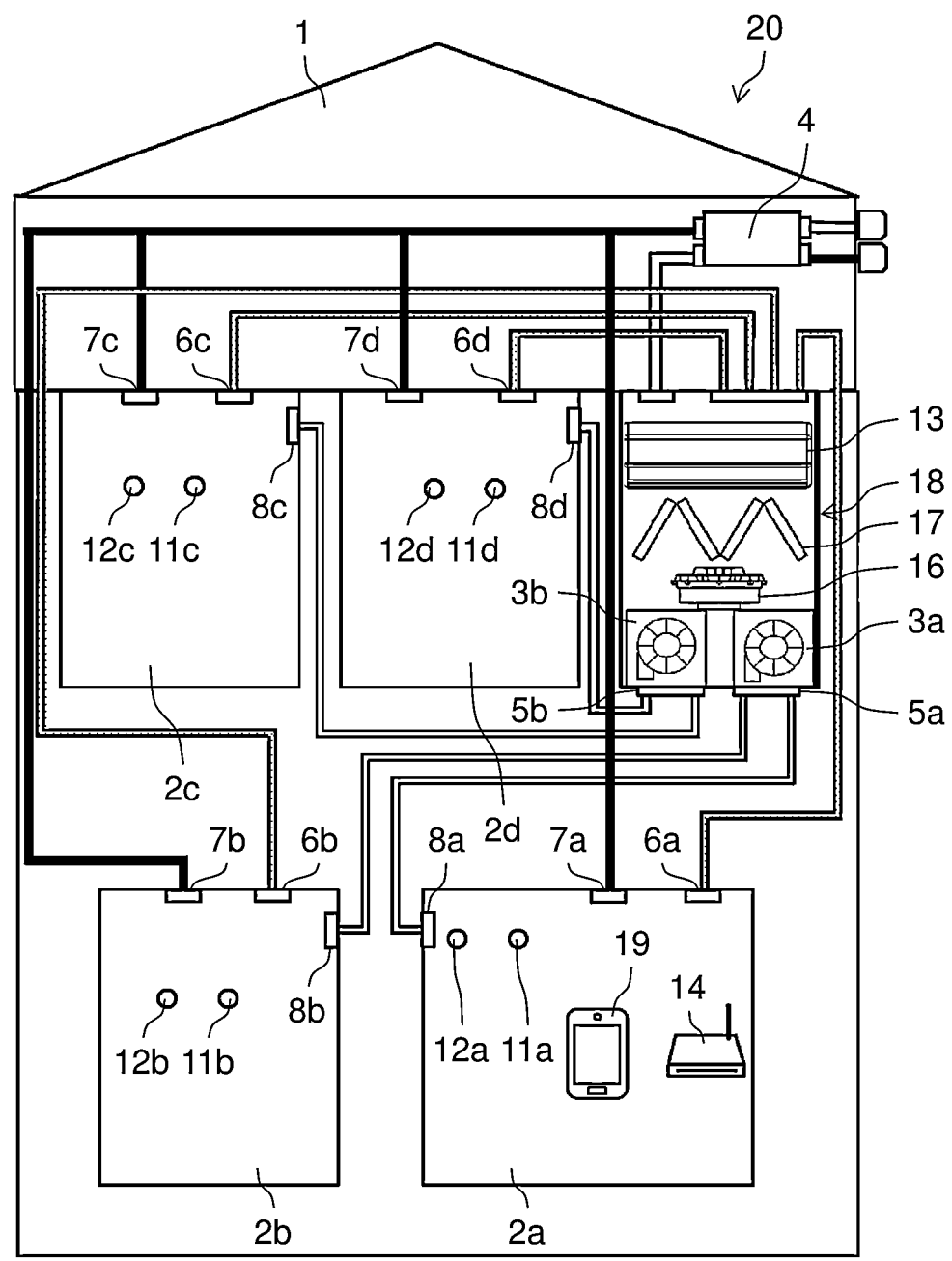
FIG. 1 is a connection schematic diagram of an air conditioning system according to a first exemplary embodiment of the present disclosure.

An air conditioning system of the present disclosure includes an air conditioning room configured to enable air to be introduced from inside and outside, an air conditioning apparatus that is installed in the air conditioning room and adjusts a temperature of air in the air conditioning room, a humidification apparatus that is installed in the air conditioning room and humidifies the air temperature-adjusted by the air conditioning apparatus, and a plurality of conveyance fans that conveys the air in the air conditioning room to a respective one of a plurality of indoor spaces independent of the air conditioning room. The humidification apparatus includes a rotation shaft that is rotated by a rotation motor, a centrifugal fan that is fixed to the rotation shaft and rotates together with the rotation shaft to introduce air temperature-adjusted by the air conditioning apparatus into the humidification apparatus, a cylindrical pumping pipe that has a pumping port on a vertically lower side, is fixed to the rotation shaft, rotates together with the rotation shaft to pump up water from the pumping port, and discharges the pumped water in a centrifugal direction, an eliminator that micronizes the water by collision of the water discharged from the pumping pipe and collects a part of micronized water droplets, and a water storage portion that is provided below the pumping pipe in a vertical direction and stores the water pumped from the pumping port.

In such a configuration, the humidification apparatus can be downsized by sharing the rotation shaft rotated by the rotation motor between the pumping pipe and the centrifugal fan as compared with a case where rotation control is performed by using individual rotation motors (and rotation shafts). Downsizing of the air conditioning room can therefore be achieved Further, in the air conditioning system of the present disclosure, the pumping pipe preferably includes a plurality of rotating plates that is arranged at predetermined intervals in the axial direction of the rotation shaft and protrudes in the centrifugal direction from the outer peripheral surface of the pumping pipe. As a result, in the pumping pipe, the pumped water can be discharged in the centrifugal direction from the pumping pipe along the rotating plates and scattered as water droplets towards the eliminator.

Further, in the air conditioning system of the present disclosure, the centrifugal fan is preferably disposed to overlap the rotating plates above the rotating plates. As a result, since the centrifugal fan and the rotating plates can be substantially integrated, the humidification apparatus can be further downsized. This can further downsize the air conditioning room.

Further, in the humidification apparatus in the air conditioning system of the present disclosure, the air introduced into the humidification apparatus from above in a vertical direction flows through the centrifugal fan to be blown out in the centrifugal direction towards the eliminator. As a result, the air blown out in the centrifugal direction and the water droplets discharged in the centrifugal direction can be mixed in the eliminator, and the air flowing through the eliminator can contain micronized water. Therefore, the humidification performance of the humidification apparatus can be improved, and the humidification amount of the air in the air conditioning room can be increased.

In the air conditioning system of the present disclosure, the eliminator includes a first eliminator through which the air blown out from the centrifugal fan flows in the centrifugal direction, and a second eliminator through which the air flowing through the first eliminator flows vertically upward. According to such a configuration, large water droplets that are difficult to vaporize can be collected and separated by the first eliminator and the second eliminator. Therefore, water droplets generated by the humidification apparatus can be prevented from being discharged to the air conditioning room.

Hereinafter, exemplary embodiments of the present disclosure will be described with reference to the drawings. Note that the following exemplary embodiments are examples embodying the present disclosure, and do not limit the technical scope of the present disclosure. Each of the drawings described in the following exemplary embodiments is a schematic view, and a ratio of a size and a thickness of each constituent element in each drawing does not necessarily reflect the actual dimensional ratio.

First Exemplary Embodiment

First, air conditioning system 20 according to a first exemplary embodiment will be described with reference to FIG. 1. FIG. 1 is a connection schematic diagram of air conditioning system 20 according to the first exemplary embodiment of the present disclosure.

Air conditioning system 20 includes a plurality of conveyance fans 3 (conveyance fans 3a, 3b), heat-exchange ventilation fan 4, a plurality of dampers 5 (dampers 5a, 5b), a plurality of circulation ports 6 (circulation ports 6a, 6b, 6c, 6d), a plurality of room exhaust ports 7 (room exhaust ports 7a, 7b, 7c, 7d), a plurality of room air supply ports 8 (room air supply ports 8a, 8b, 8c, 8d), room temperature sensors 11 (room temperature sensors 11a, 11b, 11c, 11d), room humidity sensors 12 (room humidity sensors 12a, 12b, 12c, 12d), air conditioner (air conditioning apparatus) 13, humidification apparatus 16, dust collecting filter 17, input and output terminal 19, and system controller 14 (corresponding to air conditioning system controller).

Air conditioning system 20 is installed in general residence 1 which is an example of a building. General residence 1 includes at least one air conditioning room 18 independent of a plurality of rooms 2 (four rooms 2a, 2b, 2c, 2d in the present exemplary embodiment) in addition to rooms 2. Here, general residence 1 (residence) is a residence provided as a place where residents live a private life, and as a general configuration, rooms 2 include a living room, a dining room, a bedroom, a private room, a children's room, and the like. The rooms provided by air conditioning system 20 may include a toilet, a bathroom, a washroom, a dressing room, and the like.

In room 2a, circulation port 6a, room exhaust port 7a, room air supply port 8a, room temperature sensor 11a, room humidity sensor 12a, system controller 14, and input and output terminal 19 are installed. In room 2b, circulation port 6b, room exhaust port 7b, room air supply port 8b, room temperature sensor 11b, and room humidity sensor 12b are installed. In room 2c, circulation port 6c, room exhaust port 7c, room air supply port 8c, room temperature sensor 11c, and room humidity sensor 12c are installed. Further, in room 2d, circulation port 6d, room exhaust port 7d, room air supply port 8d, room temperature sensor 11d, and room humidity sensor 12d are installed.

In air conditioning room 18, conveyance fan 3a, conveyance fan 3b, damper 5a, damper 5b, air conditioner 13, dust collecting filter 17, and humidification apparatus 16 are installed. More specifically, air conditioner 13, dust collecting filter 17, humidification apparatus 16, conveyance fans 3 (conveyance fans 3a, 3b), and dampers 5 (dampers 5a, 5b) are disposed in this order from the upstream side of the flow path for the air flowing in air conditioning room 18.

In air conditioning room 18, the air (indoor air) conveyed from each room 2 through circulation port 6 is mixed with the outside air (outdoor air) taken in by heat-exchange ventilation fan 4 and subjected to heat exchange. A temperature and humidity of the air in air conditioning room 18 are controlled, that is, conditioned by air conditioner 13 and humidification apparatus 16 provided in air conditioning room 18. In such a manner, the air to be conveyed to rooms 2 is generated. The air conditioned in air conditioning room 18 is conveyed to respective rooms 2 by conveyance fans 3. Here, air conditioning room 18 means a space having a certain size in which air conditioner 13, humidification apparatus 16, dust collecting filter 17, and the like can be disposed and the air conditioning of each room 2 can be controlled, but does not mean a living space, and basically does not mean a room in which a resident stays.

The air in rooms 2 is conveyed to air conditioning room 18 through circulation ports 6, and is heat-exchanged by heat-exchange ventilation fan 4 to be discharged outside through room exhaust ports 7. Air conditioning system 20 takes outside air (outdoor air) in while discharging inside air (indoor air) from rooms 2 through heat-exchange ventilation fan 4 to perform ventilation with a first-type ventilation method. The ventilation air volume of heat-exchange ventilation fan 4 can be set in a plurality of stages, and the ventilation air volume is set so as to satisfy a required ventilation volume defined by laws and regulations.

Heat-exchange ventilation fan 4 includes an air supply fan (not illustrated) and an air exhaust fan (not illustrated) therein, and ventilates while exchanging heat between inside air (indoor air) and outside air (outdoor air) by operating the fans. At this time, heat-exchange ventilation fan 4 conveys the heat-exchanged outside air to air conditioning room 18.

Conveyance fans 3 are provided on a wall surface (a wall surface on the bottom surface side) of air conditioning room 18. Then, the air in air conditioning room 18 is conveyed from room air supply ports 8 to rooms 2 via the conveyance ducts by conveyance fans 3. More specifically, the air in air conditioning room 18 is conveyed to rooms 2a and 2b located on the first floor of general residence 1 by conveyance fan 3a, and is conveyed to rooms 2c and 2d located on the second floor of general residence 1 by conveyance fan 3b. The conveyance ducts connected to room air supply ports 8 of rooms 2 are provided independently of each other.

Dampers 5 adjust the air blowing amount of air to rooms 2 respectively by adjusting opening degrees of dampers 5 when conveying air from conveyance fans 3 to rooms 2. More specifically, damper 5a adjusts the air blowing amount of air to room 2a and room 2b located on the first floor. Damper 5b adjusts the air blowing amount of air to room 2c and room 2d located on the second floor.

A part of the air in rooms 2 (rooms 2a to 2d) is conveyed to air conditioning room 18 via the circulation ducts by corresponding circulation ports 6 (circulation ports 6a to 6d), respectively. Here, the air conveyed through circulation port 6 is naturally conveyed to air conditioning room 18 as circulating air by a difference between the volume of air (volume of supply air) conveyed from air conditioning room 18 to respective rooms 2 by conveyance fans 3 and the volume of air (volume of exhaust air) exhausted outside from room exhaust ports 7 by heat-exchange ventilation fan 4. Although the circulation ducts that connect air conditioning room 18 and rooms 2 may be provided independently of each other, a plurality of branch ducts that is a part of the circulation ducts may be merged at the middle to be integrated as one circulation duct, and the one circulation duct may be connected to air conditioning room 18.

As described above, circulation ports 6 (circulation ports 6a to 6d) are openings for conveying indoor air from rooms 2 (rooms 2a to 2d) to air conditioning room 18.

As described above, room exhaust ports 7 (room exhaust ports 7a to 7d) are openings for conveying indoor air from rooms 2 (rooms 2a to 2d) to heat-exchange ventilation fan 4.

As described above, room air supply ports 8 (room air supply ports 8a to 8d) are openings for conveying air in air conditioning room 18 from air conditioning room 18 to rooms 2 (rooms 2a to 2d).

Room temperature sensors 11 (room temperature sensors 11a to 11d) are sensors that acquire room temperatures (indoor temperatures) of corresponding rooms 2 (rooms 2a to 2d), and transmit the room temperatures to system controller 14.

Room humidity sensors 12 (room humidity sensors 12a to 12d) are sensors that acquire room humidity (indoor humidity) of corresponding rooms 2 (rooms 2a to 2d), and transmit the room humidity to system controller 14.

Air conditioner 13 corresponds to an air conditioning apparatus, and controls air conditioning of air conditioning room 18. Air conditioner 13 cools or heats the air in air conditioning room 18 such that the temperature of the air in air conditioning room 18 becomes a set temperature (air conditioning room target temperature). Here, a required amount of heat is calculated from a temperature difference between a target temperature (room target temperature) set by a user and the room temperature, and the set temperature is set to a temperature based on the calculated result. In the present exemplary embodiment, the set temperature is set to a first temperature that is at least higher than the target temperature in order to adjust the temperatures of the air in rooms 2 to the target temperature more quickly.

Humidification apparatus 16 is located downstream air conditioner 13 in air conditioning room 18, and humidifies the air in air conditioning room 18 so that the humidity of the air in rooms 2 (room humidity) becomes target humidity (room target humidity) set by the user when the humidity is lower than the target humidity. In addition, the humidity in the present exemplary embodiment is indicated by relative humidity, but may be treated as absolute humidity in predetermined conversion processing. In this case, in entire handling of air conditioning system 20, the humidity of rooms 2 is preferably handled as the absolute humidity.

Dust collecting filter 17 is a dust collecting filter that collects particles floating in the air introduced into air conditioning room 18. Dust collecting filter 17 collects particles contained in the air conveyed into air conditioning room 18 through circulation ports 6, thereby making the air to be supplied indoors by conveyance fans 3 clean.

System controller 14 is a controller that controls entire air conditioning system 20. System controller 14 is connected to be communicable with heat-exchange ventilation fan 4, conveyance fans 3, dampers 5, room temperature sensors 11, room humidity sensors 12, air conditioner 13, and humidification apparatus 16 by wireless communication.

System controller 14 controls air conditioner 13 as the air conditioning apparatus, humidification apparatus 16, air volumes of conveyance fans 3, and the opening degrees of dampers 5 in accordance with the room temperatures and the room humidity of rooms 2 acquired by room temperature sensors 11 and room humidity sensors 12 and the target temperatures (room target temperatures) and the target humidity (room target humidity) set for rooms 2a to 2d, respectively. The air volumes of conveyance fans 3 may be individually controlled.

As a result, the air conditioned in air conditioning room 18 is conveyed to respective rooms 2 with the air volumes being set by conveyance fans 3 and dampers 5. Thus, the room temperatures and the room humidity of rooms 2 are controlled so as to become the target temperatures (room target temperatures) and the target humidity (room target humidity).

System controller 14 is connected with heat-exchange ventilation fan 4, conveyance fans 3, dampers 5, room temperature sensors 11, room humidity sensors 12, air conditioner 13, and humidification apparatus 16 by wireless communication, thereby eliminating a complicated wiring construction. However, all these devices, or system controller 14 and a part of these devices may be configured to be communicable by wired communication.

Input and output terminal 19 is connected to be communicable with system controller 14 by wireless communication, receives an input of information necessary for constructing air conditioning system 20, and causes system controller 14 to store the information, and acquires a state of air conditioning system 20 from system controller 14 and displays the state. Examples of input and output terminal 19 include a mobile information terminal such as a mobile phone, a smartphone, and a tablet.

Input and output terminal 19 is not necessarily connected to system controller 14 by wireless communication, and may be connected to be communicable with system controller 14 by wired communication. In this case, input and output terminal 19 may be implemented by, for example, a remote controller on a wall.

Figure 2:
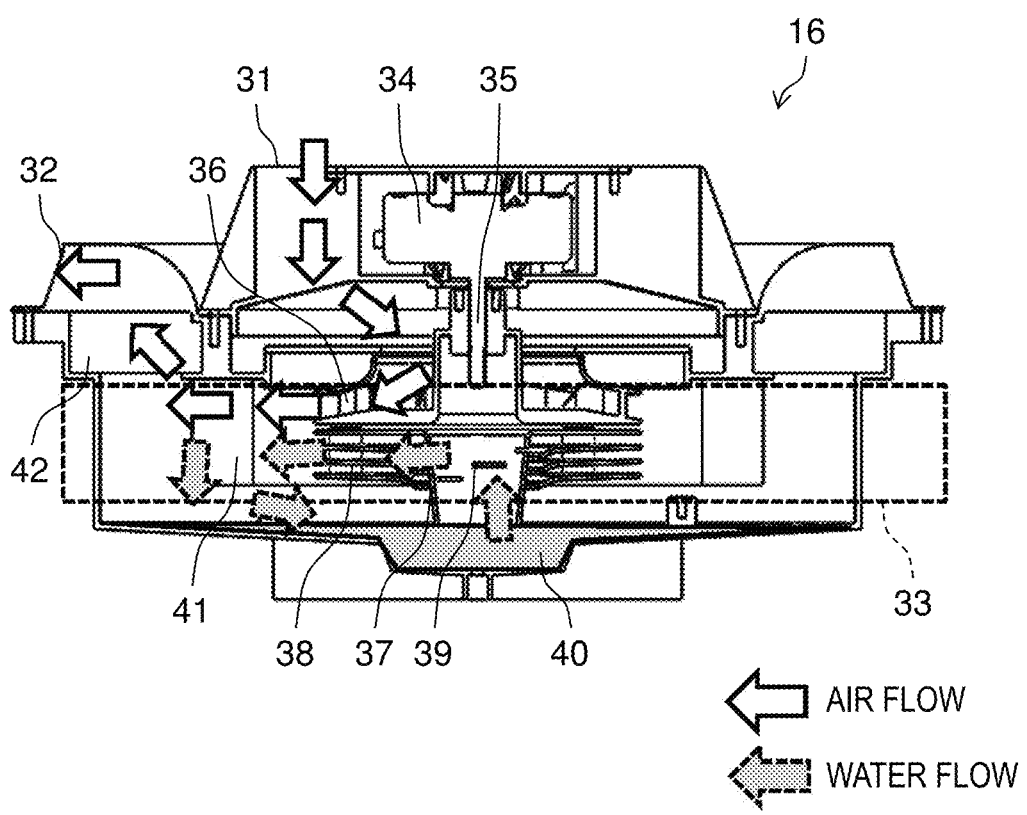
FIG. 2 is a schematic cross-sectional view of a humidification apparatus included in the air conditioning system.

Next, a configuration of humidification apparatus 16 will be described with reference to FIG. 2. FIG. 2 is a schematic cross-sectional view of humidification apparatus 16 included in air conditioning system 20.

Humidification apparatus 16 is located downstream air conditioner 13 in air conditioning room 18, and humidifies the air in air conditioning room 18 by centrifugal water crushing. As illustrated in FIG. 2, humidification apparatus 16 includes suction port 31 for sucking air in air conditioning room 18, blow-out port 32 for blowing out humidified air into air conditioning room 18, an air passage provided between suction port 31 and blow-out port 32, and liquid micronization chamber 33 provided in the air passage.

Suction port 31 is provided on an upper surface of a housing constituting an outer frame of humidification apparatus 16. Blow-out port 32 is provided on a side surface of the housing. Liquid micronization chamber 33 is a main part of humidification apparatus 16, and performs micronization of water by a centrifugal water crushing method. Specifically, humidification apparatus 16 includes rotation motor 34, rotation shaft 35 rotated by rotation motor 34, centrifugal fan 36, cylindrical pumping pipe 37, water storage portion 40, first eliminator 41, and second eliminator 42.

Pumping pipe 37 is fixed to rotation shaft 35 inside liquid micronization chamber 33, and pumps up water from a circular pumping port provided vertically downward while rotating in accordance with the rotation of rotation shaft 35. More specifically, pumping pipe 37 has an inverted conical hollow structure, and includes the circular pumping port vertically downward, and rotation shaft 35 disposed in the vertical direction is fixed to the center of the top surface of the inverted conical shape above pumping pipe 37. When rotation shaft 35 is connected to rotation motor 34 positioned vertically above liquid micronization chamber 33, the rotary motion of rotation motor 34 is conducted to pumping pipe 37 through rotation shaft 35, and pumping pipe 37 rotates.

Pumping pipe 37 includes a plurality of rotating plates 38 formed on the top surface side of the inverted conical shape so as to protrude outward from the outer surface of pumping pipe 37. The plurality of rotating plates 38 is disposed so as to protrude outward from the outer surface of pumping pipe 37 with predetermined intervals being provided respectively in the axial direction of rotation shaft 35 between rotating plates 38 vertically adjacent to each other. Since rotating plates 38 rotate together with pumping pipe 37, they preferably have a horizontal disc shape coaxial with rotation shaft 35. Note that the number of rotating plates 38 is appropriately set in accordance with target performance or a dimension of pumping pipe 37.

A wall surface of pumping pipe 37 is provided with a plurality of openings 39 penetrating the wall surface of pumping pipe 37. Each of the plurality of openings 39 is provided at a position where the inside of pumping pipe 37 communicates with the upper surfaces of rotating plates 38 formed so as to protrude outward from the outer surface of pumping pipe 37.

Centrifugal fan 36 is disposed so as to overlap pumping pipe 37 (more precisely, rotating plates 38) vertically above pumping pipe 37, and takes air into the apparatus from air conditioning room 18. Centrifugal fan 36 is fixed to rotation shaft 35 like pumping pipe 37, and rotates in accordance with the rotation of rotation shaft 35 to introduce air into liquid micronization chamber 33. That is, centrifugal fan 36 is configured to rotate integrally with pumping pipe 37 by the rotation shaft 35.

Water storage portion 40 stores water pumped by pumping pipe 37 through the pumping port vertically below pumping pipe 37. Water storage portion 40 is designed to have a depth in which a part of the lower portion of pumping pipe 37, for example, a length of about $1/3$ to $1/100$ of the conical height of pumping pipe 37 is immersed. This depth can be provided in accordance with a required pumping amount. The bottom surface of water storage portion 40 is formed into a mortar shape towards the pumping port. Water is supplied to water storage portion 40 by a water supply portion (not illustrated).

First eliminator 41, which is a porous body through which air can flow, is provided on the side (outer peripheral portion in the centrifugal direction) of liquid micronization chamber 33, and is disposed so that air flows in the centrifugal direction. In first eliminator 41, a water droplet discharged from opening 39 of pumping pipe 37 collides with first eliminator 41 to be micronized. First eliminator 41 collects water droplets out of water contained in the air passing through liquid micronization chamber 33. As a result, the air flowing in humidification apparatus 16 contains vaporized water.

Second eliminator 42 is provided downstream first eliminator 41, and is disposed so that air flows vertically upward. Second eliminator 42 is also a porous body through which air can flow. When air passing through first eliminator 41 collides with second eliminator 42, second eliminator 42 collects water droplets of water contained in the air passing through second eliminator 42. As a result, the micronized water droplets are doubly collected by the two eliminators, thereby collecting water droplets having a large particle size more accurately.

Figure 3:
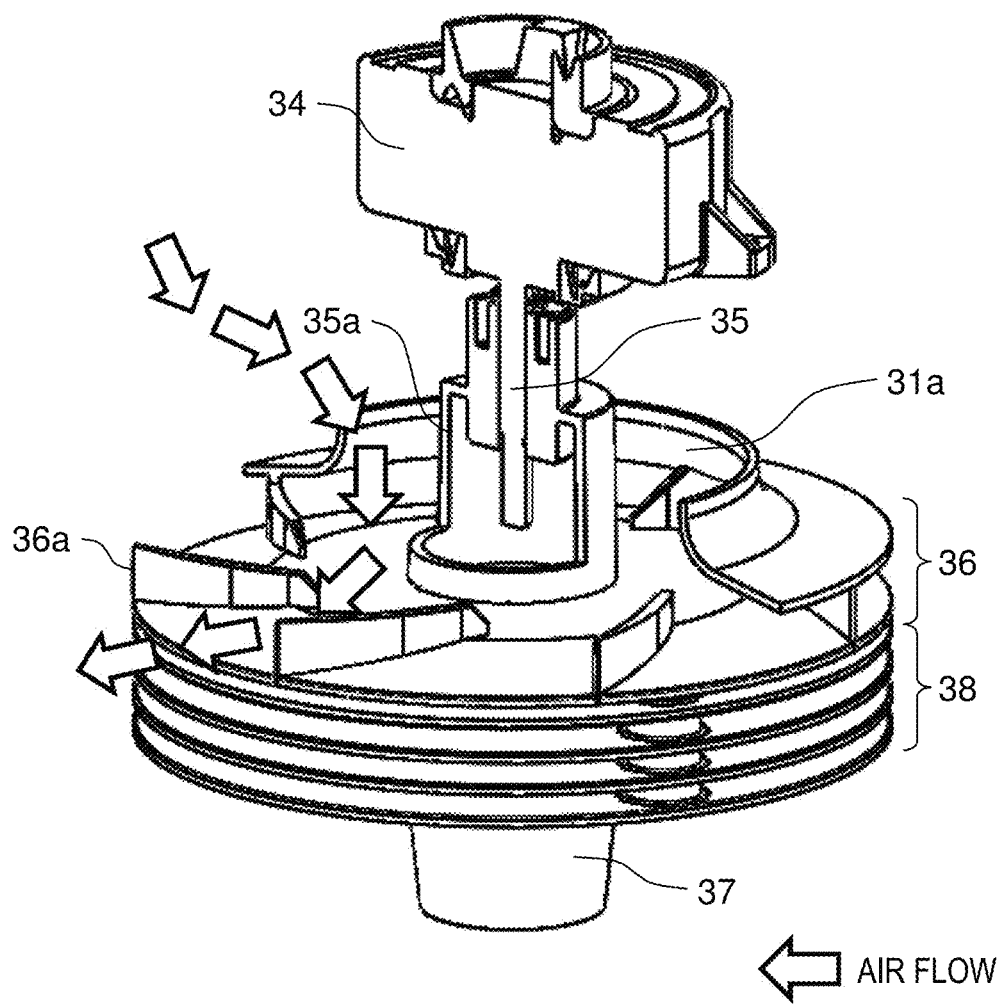
FIG. 3 is a perspective cross-sectional view of a far-sighted fan and a pumping pipe included in the humidification apparatus.

Next, the configurations of centrifugal fan 36 and pumping pipe 37 included in humidification apparatus 16 will be described in detail with reference to FIG. 3. FIG. 3 is a perspective cross-sectional view of centrifugal fan 36 and pumping pipe 37 included in humidification apparatus 16.

As illustrated in FIG. 3, rotation shaft 35 connected to rotation motor 34 is configured integrally with housing pipe 35a located on an outer periphery of rotation shaft 35. Housing pipe 35a is connected with pumping pipe 37 below housing pipe 35a in the vertical direction, and is connected with disc-shaped centrifugal fan 36 so as to protrude outward from the outer surface of housing pipe 35a.

As described above, the plurality of rotating plates 38 is connected to pumping pipe 37 at predetermined intervals so as to protrude outward from the outer surface of pumping pipe 37.

On the other hand, centrifugal fan 36 includes, between the pair of upper and lower discs, fixed blades 36a that generate a swirl flow when centrifugal fan 36 rotates. Centrifugal fan 36 is configured to have the same outer diameter as the outer diameter of rotating plates 38, and is disposed to overlap rotating plates 38 vertically above rotating plates 38 connected to pumping pipe 37.

As described above, centrifugal fan 36 and rotating plates 38 included in pumping pipe 37 rotate in accordance with the rotation of rotation shaft 35 to integrally rotate.

Next, an operation principle of humidification (micronization of water) in humidification apparatus 16 will be described with reference to FIG. 2. In FIG. 2, the air flow and the water flow in humidification apparatus 16 are indicated by arrows.

First, when the operation of humidification apparatus 16 is started, rotation shaft 35 is rotated at a first rotation speed R1 by rotation motor 34, and the air in air conditioning room 18 is started to be sucked from suction port 31 (suction port 31a communicating with suction port 31 in liquid micronization chamber 33: see FIG. 3) by centrifugal fan 36. Then, pumping pipe 37 rotates at the first rotation speed R1 in accordance with the rotation of rotation shaft 35. Then, in the water flow indicated by dashed arrows in FIG. 2, the water stored in water storage portion 40 is pumped up by a centrifugal force that is generated by the rotation of pumping pipe 37. Here, the first rotation speed R1 of rotation motor 11 (pumping pipe 37) is set, for example, between 2000 rpm and 5000 rpm in accordance with an air blowing amount and a humidification amount for air. Since pumping pipe 37 has an inverted conical hollow structure, water pumped up by rotation is pumped up along the inner wall of pumping pipe 37. Then, the pumped water is discharged in the centrifugal direction from opening 39 of pumping pipe 37 along rotating plates 38 and scattered as water droplets.

The water droplets scattered from rotating plates 38 fly in a space (liquid micronization chamber 33) surrounded by first eliminator 41, and collide with first eliminator 41 to be micronized. On the other hand, the air passing through liquid micronization chamber 33 moves to the outer peripheral portion of first eliminator 41 while containing the water crushed (micronized) by first eliminator 41 as in an air flow indicated by solid arrows in FIG. 2. during the air flowing in the air passage from first eliminator 41 to second eliminator 42, a vortex of air flow is generated, and water and air are mixed. The air containing water then passes through second eliminator 42. As a result, humidification apparatus 16 can humidify the air sucked from suction port 31 and blow out the humidified air from blow-out port 32.

Note that the liquid to be micronized may be other than water, and may be, for example, a liquid such as hypochlorous acid water having bactericidal properties or deodorization properties.

Air conditioning system 20 according to the first exemplary embodiment described above can produce the following effects.

(1) Air conditioning system 20 includes air conditioning room 18 configured to enable air to be introduced from inside and outside, air conditioner 13 that is installed in air conditioning room 18 and controls a temperature of the air in air conditioning room 18, humidification apparatus 16 that is installed in air conditioning room 18 and humidifies the air temperature-adjusted by air conditioner 13, and the plurality of conveyance fans 3 that conveys the air in air conditioning room 18 to a respective one of the plurality of indoor spaces (rooms 2) independent of air conditioning room 18. Humidification apparatus 16 is configured to include rotation shaft 35 that is rotated by rotation motor 34, centrifugal fan 36 that is fixed to rotation shaft 35 and rotates together with rotation shaft 35 to introduce air temperature-adjusted by air conditioner 13 into the humidification apparatus, cylindrical pumping pipe 37 that has the pumping port on a vertically lower side, is fixed to rotation shaft 35, rotates together with rotation shaft 35 to pump up water from the pumping port, and discharges the pumped water in the centrifugal direction, first eliminator 41 that micronizes water by collision of the water discharged from pumping pipe 37 and collects a part of micronized water droplets, and water storage portion 40 that is disposed vertically below pumping pipe 37 and stores the water pumped from the pumping port.

In such a configuration, humidification apparatus 16 can be downsized by sharing rotation shaft 35 rotated by rotation motor 34 between pumping pipe 37 and centrifugal fan 36 as compared with a case where rotation control is performed by using individual rotation motors (and rotation shafts). Downsizing of air conditioning room 18 can therefore be achieved.

(2) In air conditioning system 20, humidification apparatus 16 is configured to include centrifugal fan 36 that introduces the air temperature-adjusted by air conditioner 13 into the apparatus, and humidification portion (liquid micronization chamber 33) that makes the air introduced by centrifugal fan 36 contain water micronized by centrifugal crushing and discharges the water. As a result, since the air is introduced into humidification apparatus 16 by centrifugal fan 36, the humidification amount of the air in air conditioning room 18 can be adjusted without depending on the volume of air conveyed from air conditioning room 18 by conveyance fans 3.

(3) In air conditioning system 20, pumping pipe 37 includes the plurality of rotating plates 38 that is arranged at predetermined intervals in the axial direction of rotation shaft 35 and protrudes in the centrifugal direction from the outer peripheral surface of pumping pipe 37. As a result, in pumping pipe 37, the pumped water can be discharged from pumping pipe 37 along rotating plates 38 in the centrifugal direction and scattered as water droplets towards first eliminator 41.

(4) In air conditioning system 20, centrifugal fan 36 is disposed to overlap rotating plates 38 vertically above rotating plates 38. As a result, since centrifugal fan 36 and rotating plates 38 can be substantially integrated, humidification apparatus 16 can be further downsized. This can further downsize air conditioning room 18.

(5) Humidification apparatus 16 is configured so that the air introduced into humidification apparatus 16 from above in the vertical direction flows through centrifugal fan 36 to be blown out in the centrifugal direction towards the eliminator (first eliminator 41). As a result, the air blown out in the centrifugal direction and the water droplets discharged in the centrifugal direction can be mixed in the eliminator (first eliminator 41), and the air flowing through the eliminator (first eliminator 41) can contain micronized water. Therefore, the humidification performance of humidification apparatus 16 can be improved, and the humidification amount of the air in air conditioning room 18 can be increased.

(6) In air conditioning system 20, the eliminator is configured to include first eliminator 41 through which the air blown out from centrifugal fan 36 flows in the centrifugal direction, and second eliminator 42 through which the air flowing through first eliminator 41 flows vertically upward. As a result, first eliminator 41 and second eliminator 42 can collect and separate large water droplets that are difficult to vaporize, thereby preventing the water droplets generated by humidification apparatus 16 from being discharged to the air conditioning room.

(7) In air conditioning system 20, since first eliminator 41 and second eliminator 42 are provided, a vortex of an air flow is generated during the air flowing in the air passage from first eliminator 41 to second eliminator 42. Thus, the mixing of water and air can be encouraged, thereby improving vaporization efficiency of water.

Although the present disclosure has been described above based on the exemplary embodiment, the present disclosure is not limited to the above exemplary embodiment at all, and it can be easily inferred that various modifications and variations can be made without departing from the gist of the present disclosure. For example, the numerical values mentioned in the above exemplary embodiment are merely examples, and other numerical values can be naturally used.

In air conditioning system 20 according to the present exemplary embodiment, an air conditioning room temperature sensor that detects the temperature of the air in air conditioning room 18 may be provided in air conditioning room 18. Accordingly, humidity control in air conditioning room 18 can be performed with higher accuracy.

In the above exemplary embodiment, a room is used, but the room may not have a person, and can be regarded as one space. That is, when a corridor or a kitchen is partitioned to some extent, the corridor and the kitchen can be regarded as one space, and corresponds to one room.

Further, air conditioning system 20 according to the present exemplary embodiment is applicable to one-unit housing or multiunit housing such as an apartment. In a case where air conditioning system 20 is applied to multiunit housing, one system corresponds to a residence unit, and each residence is not one room.

Second Exemplary Embodiment

In the related art, an entire building air conditioning apparatus has performed air conditioning on a residence. High-heat-insulating and high-airtight residential buildings are predicted to increase along with an increase in demand for energy-saving residential buildings and tightening of regulations, and an air conditioning system suitable for the characteristics thereof is demanded.

As such an air conditioning system, an entire-building air conditioning system is known (for example, PTL 1). The entire-building air conditioning system conditions air conveyed from a plurality of spaces (rooms) or the like to an air conditioning room at a predetermined temperature and humidity in the air conditioning room and then conveys the air to the plurality of spaces or the like so that the temperatures and humidity of the air in the plurality of spaces or the like become target temperatures and humidity.

In a conventional entire-building air conditioning system, a temperature of air in an air conditioning room is controlled by an air conditioning apparatus (air conditioner) installed in the air conditioning room. The humidity of the air in the air conditioning room is controlled by a humidifier similarly installed in the air conditioning room. In particular, since the humidifier used in winter can use air heated by a heat source of the air conditioning apparatus, the humidification amount of the air in the air conditioning room can be increased. However, in a case where the temperatures of the air in the plurality of spaces (rooms) reach the target temperatures, the temperature of the air in the air conditioning room is decreased by stopping the heat source of the air conditioning apparatus or lowering the amount of heat. As a result, the humidification amount of the air in the air conditioning room decreases in the humidifier. Therefore, in the conventional entire-building air conditioning system, the time period until the humidity of the air in the plurality of spaces (rooms) reaches the target humidity may become long. That is, in the conventional entire-building air conditioning system, the humidification performance of the humidifier is changed by the operation of the heat source of the air conditioning apparatus, thereby causing an issue that the humidification control by the humidifier is not stable.

The present disclosure provides an air conditioning system capable of performing humidification control using a humidification apparatus in conjunction with temperature control using air conditioning apparatus.

The air conditioning system of the present disclosure includes an air conditioning room configured to enable air to be introduced from inside and outside, an air conditioning apparatus that is installed in the air conditioning room and adjusts a temperature of air in the air conditioning room, a humidification apparatus that is installed in the air conditioning room and humidifies the air temperature-adjusted by the air conditioning apparatus, a plurality of conveyance fans that respectively conveys the air in the air conditioning room to a plurality of indoor spaces independent of the air conditioning room, and a controller that controls the air conditioning apparatus, the humidification apparatus, and the conveyance fans. Then, in order to adjust the temperature of the indoor air to the target temperature, the controller controls temperature adjustment using the air in the air conditioning room whose temperature has been raised to a first temperature higher than the target temperature by the air conditioning apparatus. At that time, in a case where the humidity of the indoor air is higher than or equal to the target humidity, first control is performed in a manner that the air conditioning apparatus adjusts the temperature of the air in the air conditioning room to a second temperature lower than the first temperature when the temperature of the indoor air rises to reach the target temperature. In a case where the humidity of the indoor air is lower than the target humidity, second control is performed in a manner that the air conditioning apparatus adjusts the temperature of the air in the air conditioning room to maintain the temperature at the first temperature when the temperature of the indoor air rises to reach the target temperature.

The present disclosure can provide the air conditioning system capable of performing humidification control using the humidification apparatus in conjunction with temperature control by the air conditioning apparatus.

The explanation is again given. The air conditioning system of the present disclosure includes the air conditioning room configured to enable air to be introduced from inside and outside, the air conditioning apparatus that is installed in the air conditioning room and adjusts the temperature of the air in the air conditioning room, the humidification apparatus that is installed in the air conditioning room and humidifies the air temperature-adjusted by the air conditioning apparatus, the plurality of conveyance fans that respectively conveys the air in the air conditioning room to the plurality of indoor spaces independent of the air conditioning room, and the controller that controls the air conditioning apparatus, the humidification apparatus, and the conveyance fans. Then, in order to adjust the temperature of the indoor air to the target temperature, the controller controls temperature adjustment using the air in the air conditioning room whose temperature has been raised to the first temperature higher than the target temperature by the air conditioning apparatus. At that time, in a case where the humidity of the indoor air is higher than or equal to the target humidity, first control is performed in a manner that the air conditioning apparatus adjusts the temperature of the air in the air conditioning room to a second temperature lower than the first temperature when the temperature of the indoor air rises to reach the target temperature. In a case where the humidity of the indoor air is lower than the target humidity, second control is performed in a manner that the air conditioning apparatus adjusts the temperature of the air in the air conditioning room to maintain the temperature at the first temperature when the temperature of the indoor air rises to reach the target temperature.

According to such a configuration, the temperature adjustment control (the first control or the second control) is performed by the air conditioning apparatus in conjunction with the humidification control using the humidification apparatus. This can control a decrease in the humidification capacity (humidification amount) of the humidification apparatus due to the temperature adjustment control by the air conditioning apparatus, thereby stabilizing the humidification performance of the air conditioning system. That is, since the air heated to the first temperature by the air conditioning apparatus is continuously introduced into the humidification apparatus, the humidification amount of the air in the air conditioning room can be increased as compared with the conventional air conditioning system, and the humidity of the air in the air conditioning room can efficiently reach the target humidity. This result in providing the air conditioning system capable of efficiently performing temperature adjustment and humidity adjustment in the rooms.

Further, in the air conditioning system of the present disclosure, in a case where performing the second control, the controller reduces the air blowing amount of air to be conveyed to the indoor spaces by the conveyance fans from the first air blowing amount set when the temperature of the indoor air reaches the target temperature to the second air blowing amount less than the first air blowing amount. As a result, in the second control, since the amounts of air conveyed indoors by the conveyance fans are reduced, the humidification control can be performed by the humidification apparatus towards the target humidity while a rise in the temperature of the indoor air (phenomenon that the temperature of the indoor air becomes higher than the target temperature) due to the temperature of the air in the air conditioning room being maintained at the first temperature is being controlled.

The air conditioning system of the present disclosure further includes a temperature and humidity sensor that acquires temperature and humidity of indoor air and transmits the temperature and humidity to the controller. Then, based on information regarding the temperature and humidity from the temperature and humidity sensor, the controller may control the air conditioning apparatus so that the temperature of the indoor air is adjusted to the target temperature, and may control the humidification apparatus so that the humidity of the indoor air is adjusted to increase to the target humidity. As a result, the air conditioning apparatus can control the temperature adjustment and the humidification apparatus can control the humidity adjustment concomitantly with the change in temperature and humidity of the indoor air, thereby improving the comfort in the indoor spaces.

Further, in the air conditioning system of the present disclosure, the humidification apparatus is configured to include the centrifugal fan that introduces the air temperature-controlled by the air conditioning apparatus into the apparatus, and the humidification portion that makes the air introduced by the centrifugal fan contain water micronized by centrifugal crushing and discharges the water. According to such a configuration, the air is introduced into the humidification apparatus by the centrifugal fan, and thus the humidification amount for of air in the air conditioning room can be adjusted without depending on the volume of air conveyed from the air conditioning room by the conveyance fans.

Hereinafter, exemplary embodiments of the present disclosure will be described with reference to the drawings. Note that the following exemplary embodiments are examples embodying the present disclosure, and do not limit the technical scope of the present disclosure. Each of the drawings described in the following exemplary embodiments is a schematic view, and a ratio of a size and a thickness of each constituent element in each drawing does not necessarily reflect the actual dimensional ratio.

Figure 4:
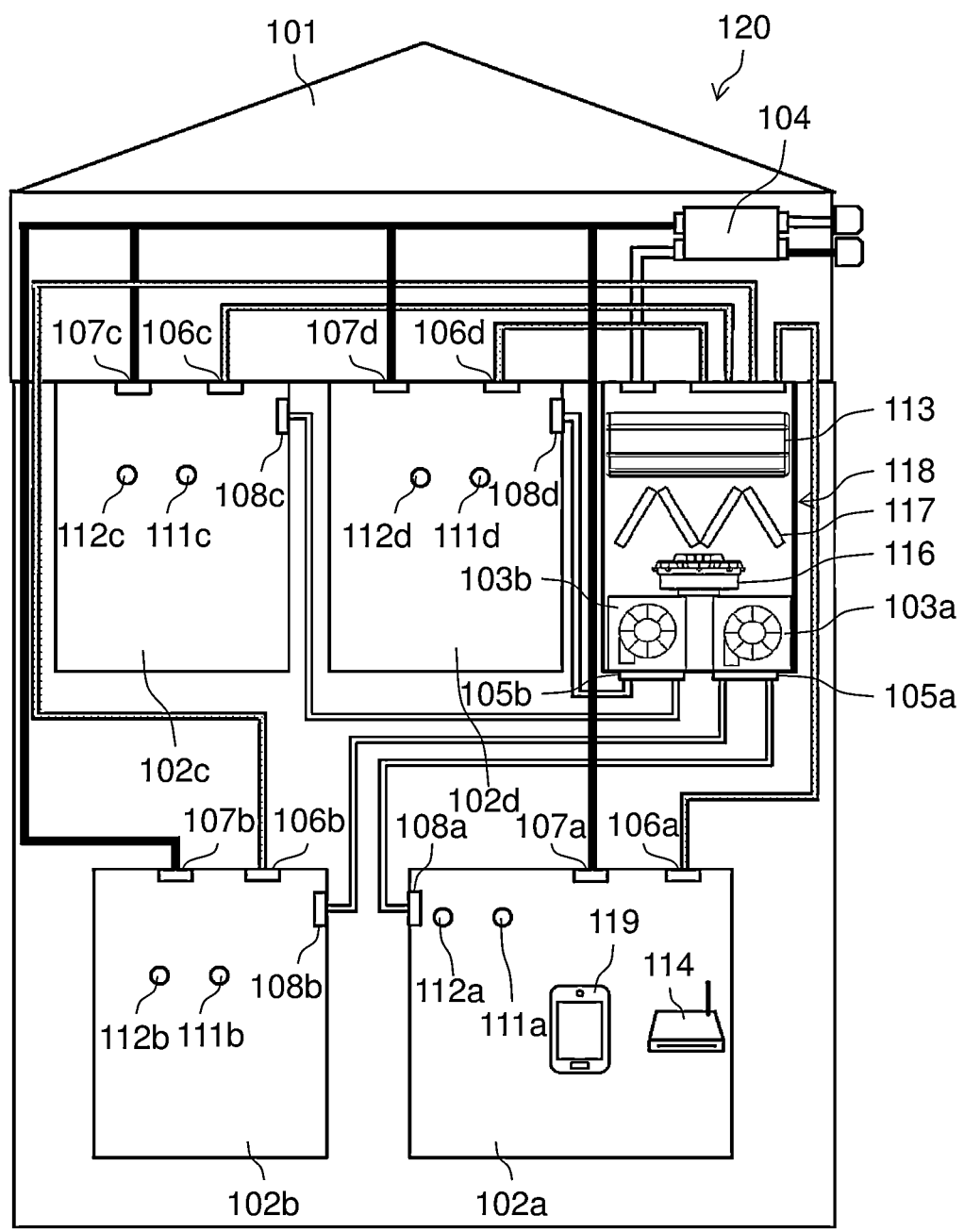
FIG. 4 is a connection schematic diagram of an air conditioning system according to a second exemplary embodiment of the present disclosure.

First, air conditioning system 120 according to the second exemplary embodiment will be described with reference to FIG. 4. FIG. 4 is a connection schematic diagram of air conditioning system 120 according to the second exemplary embodiment of the present disclosure.

Air conditioning system 120 includes a plurality of conveyance fans 103 (conveyance fans 103a, 103b), heat-exchange ventilation fan 104, a plurality of dampers 105 (dampers 105a, 105b), a plurality of circulation ports 106 (circulation ports 106a, 106b, 106c, 106d), a plurality of room exhaust ports 107 (room exhaust ports 107a, 107b, 107c, 107d), a plurality of room air supply ports 108 (room air supply ports 108a, 108b, 108c, 108d), room temperature sensor 111 (room temperature sensors 111a, 111b, 111c, 111d), room humidity sensor 112 (room humidity sensors 112a, 112b, 112c, 112d), air conditioner (air conditioning apparatus) 113, humidification apparatus 116, dust collecting filter 117, input and output terminal 119, and system controller 114 (corresponding to air conditioning system controller).

Air conditioning system 120 is installed in general residence 101 which is an example of a building. General residence 101 includes at least one air conditioning room 118 independent of a plurality of (four in the present exemplary embodiment) rooms 102 (rooms 102a, 102b, 102c, 102d) in addition to rooms 102. Here, general residence 101 (residence) is a residence provided as a place where residents live a private life, and as a general configuration, rooms 102 include a living room, a dining room, a bedroom, a private room, a children's room, and the like. The rooms provided by air conditioning system 120 may include a toilet, a bathroom, a washroom, a dressing room, and the like.

In room 102a, circulation port 106a, room exhaust port 107a, room air supply port 108a, room temperature sensor 111a, room humidity sensor 112a, system controller 114, and input and output terminal 119 are installed. In room 102b, circulation port 106b, room exhaust port 107b, room air supply port 108b, room temperature sensor 111b, and room humidity sensor 112b are installed. In room 102c, circulation port 106c, room exhaust port 107c, room air supply port 108c, room temperature sensor 111c, and room humidity sensor 112c are installed. Further, in room 102d, circulation port 106d, room exhaust port 107d, room air supply port 108d, room temperature sensor 111d, and room humidity sensor 112d are installed.

In air conditioning room 118, conveyance fan 103a, conveyance fan 103b, damper 105a, damper 105b, air conditioner 113, dust collecting filter 117, and humidification apparatus 116 are installed. More specifically, air conditioner 113, dust collecting filter 117, humidification apparatus 116, conveyance fans 103 (conveyance fan 103a, 103b), and dampers 105 (dampers 105a, 105b) are disposed in this order from the upstream side of the flow path for the air flowing in air conditioning room 118.

In air conditioning room 118, the air (indoor air) conveyed from rooms 102 through circulation ports 106 is mixed with the outside air (outdoor air) taken in by heat-exchange ventilation fan 104 and subjected to heat exchange. A temperature and humidity of the air in air conditioning room 118 are controlled by air conditioner 113 and humidification apparatus 116 provided in air conditioning room 118, that is, conditioned. In such a manner, the air to be conveyed to rooms 102 is generated. The air conditioned in air conditioning room 118 is conveyed to respective rooms 102 by conveyance fans 103. Here, air conditioning room 118 means a space having a certain size in which air conditioner 113, humidification apparatus 116, dust collecting filter 117, and the like can be disposed and the air conditioning of each room 102 can be controlled, but does not mean a living space, and basically does not mean a room where a resident stays.

The air in rooms 102 is conveyed to air conditioning room 118 through circulation ports 106, and is heat-exchanged by heat-exchange ventilation fan 104 to be discharged outside through room exhaust ports 107. Air conditioning system 120 takes outside air (outdoor air) in while discharging inside air (indoor air) from rooms 102 by heat-exchange ventilation fan 104 to perform ventilation with a first-type ventilation method. The ventilation air volume of heat-exchange ventilation fan 104 can be set in a plurality of stages, and the ventilation air volume is set so as to satisfy a required ventilation volume defined by laws and regulations.

Heat-exchange ventilation fan 104 includes an air supply fan (not illustrated) and an air exhaust fan (not illustrated) therein, and ventilates while exchanging heat between inside air (indoor air) and outside air (outdoor air) by operating the fans. At this time, heat-exchange ventilation fan 104 conveys the heat-exchanged outside air to air conditioning room 118.

Conveyance fans 103 are provided on a wall surface (a wall surface on the bottom surface side) of air conditioning room 118. Then, the air in air conditioning room 118 is conveyed from room air supply ports 108 to rooms 102 via the conveyance ducts by conveyance fans 103. More specifically, the air in air conditioning room 118 is conveyed to rooms 102a and 102b located on the first floor of general residence 101 by conveyance fan 103a, and is conveyed to rooms 102c and 102d located on the second floor of general residence 101 by conveyance fan 103b. The conveyance ducts connected to room air supply ports 108 of rooms 102 are provided independently of each other.

Dampers 105 adjust the air blowing amount of air to rooms 102 respectively by adjusting opening degrees of dampers 105 when conveying air from conveyance fans 103 to rooms 102. More specifically, damper 105a adjusts the air blowing amount of air to room 102a and room 102b located on the first floor. Damper 105b adjusts the air blowing amount of air to room 102c and room 102d located on the second floor.

A part of the air in rooms 102 (rooms 102a to 102d) is conveyed to air conditioning room 118 via the circulation ducts through corresponding circulation ports 106 (circulation ports 106a to 106d), respectively. Here, the air conveyed through circulation ports 106 is naturally conveyed as circulation air to air conditioning room 118 by a difference between the volume of air (supply volume of air) conveyed from air conditioning room 118 to respective rooms 102 by conveyance fans 103 and the volume of air (exhaust volume of air) exhausted outside from room exhaust ports 107 by heat-exchange ventilation fan 104. Although the circulation ducts that connect air conditioning room 118 and rooms 102 may be provided independently of each other, a plurality of branch ducts that is a part of the circulation ducts may be merged at the middle to be integrated as one circulation duct, and the one circulation duct may be connected to air conditioning room 118.

As described above, circulation ports 106 (circulation ports 106a to 106d) are openings for conveying the indoor air from rooms 102 (rooms 102a to 102d) to air conditioning room 118.

As described above, room exhaust ports 107 (room exhaust ports 107a to 107d) are openings for conveying the indoor air from rooms 102 (rooms 102a to 102d) to heat-exchange ventilation fan 104.

As described above, room air supply ports 108 (room air supply ports 108a to 108d) are openings for conveying air in air conditioning room 118 from air conditioning room 118 to rooms 102 (rooms 102a to 102d).

Room temperature sensors 111 (room temperature sensors 111a to 111d) are sensors that acquire indoor temperatures of corresponding rooms 102 (rooms 102a to 102d), and transmit the indoor temperatures to system controller 114.

Room humidity sensors 112 (room humidity sensors 112a to 112d) are sensors that acquire room humidity (indoor humidity) of corresponding rooms 102 (rooms 102a to 102d), and transmit the room humidity to system controller 114.

Air conditioner 113 corresponds to an air conditioning apparatus, and controls air conditioning of air conditioning room 118. Air conditioner 113 cools or heats the air in air conditioning room 118 such that the temperature of the air in air conditioning room 118 becomes a set temperature (air conditioning room target temperature). Here, a required amount of heat is calculated from a temperature difference between a target temperature (room target temperature) set by a user and the room temperature, and the set temperature is set to a temperature based on the calculated result. In the present exemplary embodiment, the set temperature is set to a first temperature that is at least higher than the target temperature in order to adjust the temperatures of the air in rooms 102 to the target temperatures more quickly.

Humidification apparatus 116 is located downstream air conditioner 113 in air conditioning room 118, and humidifies the air in air conditioning room 118 so that the humidity of the air in rooms 102 (room humidity) becomes the target humidity when the humidity is lower than the target humidity (room target humidity) set by the user. In addition, the humidity in the present exemplary embodiment is indicated by relative humidity, but may be treated as absolute humidity in predetermined conversion processing. In this case, in entire handling of air conditioning system 120, the humidity of rooms 102 is preferably handled as the absolute humidity.

Dust collecting filter 117 is a dust collecting filter that collects particles floating in the air introduced into air conditioning room 118. Dust collecting filter 117 collects particles contained in the air conveyed into air conditioning room 118 through circulation ports 106, thereby making the air to be supplied indoors by conveyance fans 103 clean.

System controller 114 is a controller that controls entire air conditioning system 120. System controller 114 is connected to be communicable with heat-exchange ventilation fan 104, conveyance fans 103, dampers 105, room temperature sensors 111, room humidity sensors 112, air conditioner 113, and humidification apparatus 116 by wireless communication. Note that system controller 114 is referred to also as a "controller".

Further, system controller 114 controls air conditioner 113 as the air conditioning apparatus, humidification apparatus 116, the air volumes of conveyance fans 103, and the opening degrees of dampers 105 in accordance with the room temperatures and the room humidity of corresponding rooms 102 acquired by room temperature sensors 111 and room humidity sensors 112 and the target temperatures (room target temperatures) and the target humidity (room target humidity) set for rooms 102a to 102d, respectively. The air volumes of conveyance fans 103 may be individually controlled.

The air conditioned in air conditioning room 118 is conveyed to respective rooms 102 with the air volumes being set by conveyance fans 103 and dampers 105. Thus, the room temperatures and the room humidity of rooms 102 are controlled so as to become the target temperatures (room target temperatures) and the target humidity (room target humidity).

System controller 114 is connected with heat-exchange ventilation fan 104, conveyance fans 103, dampers 105, room temperature sensors 111, room humidity sensors 112, air conditioner 113, and humidification apparatus 116 by wireless communication, thereby eliminating a complicated wiring construction. However, all these devices, or system controller 114 and a part of these devices may be configured to be communicable by wired communication.

Input and output terminal 119 is connected to be communicable with system controller 114 by wireless communication, receives an input of information necessary for constructing air conditioning system 120, and stores the information in system controller 114, and acquires a state of air conditioning system 120 from system controller 114 and displays the state. Examples of input and output terminal 119 include a mobile information terminal such as a mobile phone, a smartphone, and a tablet.

Input and output terminal 119 is not necessarily connected to system controller 114 by wireless communication, and may be connected to be communicable with system controller 114 by wired communication. In this case, input and output terminal 119 may be implemented by, for example, a remote controller on a wall.

Figure 5:
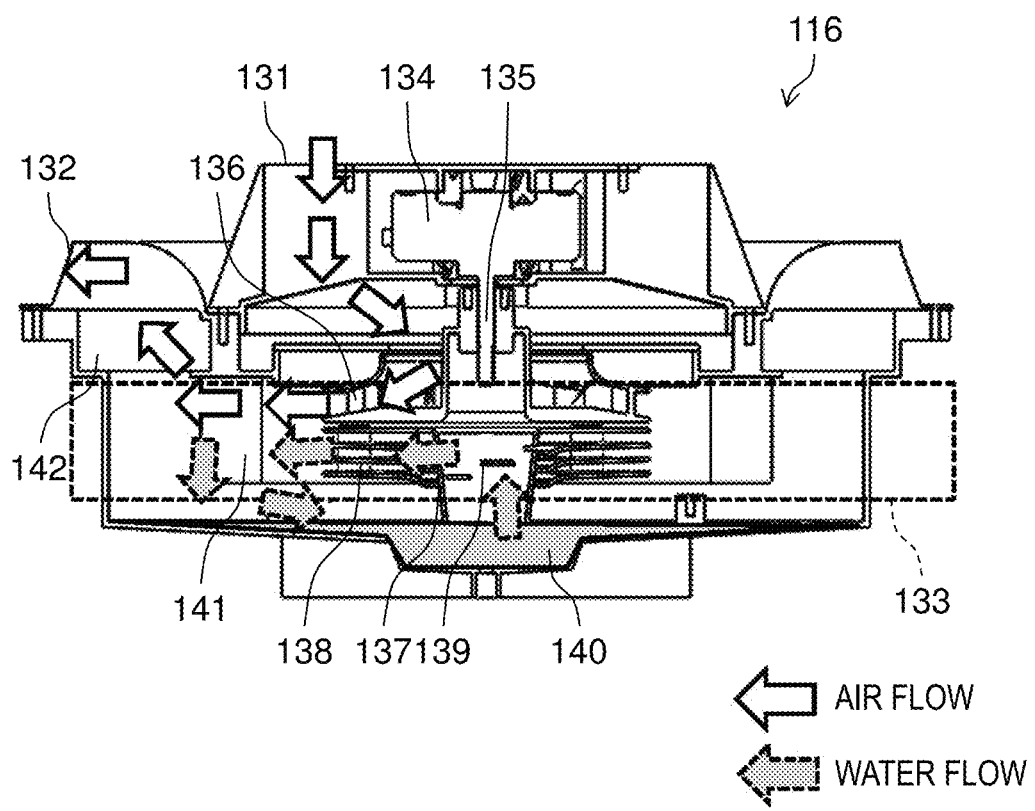
FIG. 5 is a schematic cross-sectional view of a humidification apparatus included in the air conditioning system.

Next, a configuration of humidification apparatus 116 will be described with reference to FIG. 5. FIG. 5 is a schematic cross-sectional view of humidification apparatus 116 included in air conditioning system 120.

Humidification apparatus 116 is located downstream air conditioner 113 in air conditioning room 118, and humidifies the air in air conditioning room 118 by centrifugal water crushing. Humidification apparatus 116 includes suction port 131 for sucking the air in air conditioning room 118, blow-out port 132 for blowing out humidified air into air conditioning room 118, an air passage provided between suction port 131 and blow-out port 132, and liquid micronization chamber 133 provided in the air passage.

suction port 131 is provided on an upper surface of a housing constituting an outer frame of humidification apparatus 116. blow-out port 132 is provided on a side surface of the housing. Liquid micronization chamber 133 is a main part of humidification apparatus 116, and performs micronization of water with a centrifugal water crushing method. Specifically, humidification apparatus 116 includes rotation motor 134, rotation shaft 135 rotated by rotation motor 134, centrifugal fan 136, cylindrical pumping pipe 137, water storage portion 140, first eliminator 141, and second eliminator 142.

Pumping pipe 137 is fixed to rotation shaft 135 inside liquid micronization chamber 133, and pumps up water from a circular pumping port provided vertically downward while rotating in accordance with the rotation of rotation shaft 135. More specifically, pumping pipe 137 has an inverted conical hollow structure, and includes the circular pumping port on the vertical lower portion, and rotation shaft 135 disposed in the vertical direction is fixed to the center of the top surface of the inverted conical shape above pumping pipe 137. When rotation shaft 135 is connected to rotation motor 134 positioned vertically above liquid micronization chamber 133, the rotary motion of rotation motor 134 is conducted to pumping pipe 137 through rotation shaft 135, and pumping pipe 137 rotates.

Pumping pipe 137 includes a plurality of rotating plates 138 formed on the top surface side of the inverted conical shape so as to protrude outward from the outer surface of pumping pipe 137. The plurality of rotating plates 138 is formed so as to protrude outward from the outer surface of pumping pipe 137 with predetermined intervals being provided respectively in the axial direction of rotation shaft 135 between rotating plates 138 vertically adjacent to each other. Since rotating plates 138 rotate together with pumping pipe 137, they preferably have a horizontal disc shape coaxial with rotation shaft 135. Note that the number of rotating plates 138 is appropriately set in accordance with target performance or a dimension of pumping pipe 137.

A wall surface of pumping pipe 137 is provided with a plurality of openings 139 penetrating the wall surface of pumping pipe 137. Each of the plurality of openings 139 is provided at a position where the inside of pumping pipe 137 communicates with the upper surfaces of rotating plates 138 formed so as to protrude outward from the outer surface of pumping pipe 137.

Centrifugal fan 136 is disposed vertically above pumping pipe 137, and takes air into the apparatus from air conditioning room 118. Centrifugal fan 136 is fixed to rotation shaft 135 like pumping pipe 137, and rotates in accordance with the rotation of rotation shaft 135 to introduce air into liquid micronization chamber 133.

Water storage portion 140 stores water pumped by pumping pipe 137 from the pumping port vertically below pumping pipe 137. Water storage portion 140 is designed to have a depth in which a part of the lower portion of pumping pipe 137, for example, a length of about ⅓ to ¹⁄₁₀₀ of the conical height of pumping pipe 137 is immersed. This depth can be provided in accordance with a required pumping amount. The bottom surface of water storage portion 140 is formed into a mortar shape towards the pumping port. Water is supplied to water storage portion 140 by a water supply portion (not illustrated).

First eliminator 141, which is a porous body through which air can flow, is provided on the side (outer peripheral portion in the centrifugal direction) of liquid micronization chamber 133, and is disposed so that air flows in the centrifugal direction. In first eliminator 141, a water droplet discharged from opening 139 of pumping pipe 137 collides with first eliminator 141 to be micronized. First eliminator 141 collects water droplets out of water contained in the air passing through liquid micronization chamber 133. As a result, the air flowing in humidification apparatus 116 contains vaporized water.

Second eliminator 142 is provided downstream first eliminator 141, and is disposed so that air flows vertically upward. Second eliminator 142 is also a porous body through which air can flow. When air passing through first eliminator 141 collides with second eliminator 142, second eliminator 142 collects water droplets of water contained in the air passing through second eliminator 142. As a result, the micronized water droplets are doubly collected by the two eliminators, thereby colleting water droplets having a large particle size more accurately.

Next, an operation principle of humidification (micronization of water) in humidification apparatus 116 will be described.

Next, the operation principle of humidification (micronization of water) in humidification apparatus 116 will be described with reference to FIG. 5. In FIG. 5, the air flow and the water flow in humidification apparatus 116 are indicated by arrows.

First, when the operation of humidification apparatus 116 is started, rotation shaft 135 is rotated at the first rotation speed R1 by rotation motor 134, and the air in air conditioning room 118 is started to be sucked from suction port 131 by centrifugal fan 136. Then, pumping pipe 137 rotates in accordance with the rotation of rotation shaft 135 at the first rotation speed R1. Then, in the water flow indicated by dashed arrows in FIG. 5, the water stored in water storage portion 140 is pumped up by the centrifugal force that is generated by the rotation of pumping pipe 137. Here, the first rotation speed R1 of rotation motor 11 (pumping pipe 137) is set, for example, between 2000 rpm and 5000 rpm in accordance with an air blowing volume and an air humidification amount. Since pumping pipe 137 has an inverted conical hollow structure, water pumped up by the rotation is pumped up along the inner wall of pumping pipe 137. Then, the pumped water is discharged in the centrifugal direction from opening 139 of pumping pipe 137 along rotating plates 138 and scattered as water droplets.

The water droplets scattered from rotating plates 138 fly in a space (liquid micronization chamber 133) surrounded by first eliminator 141, and collide with first eliminator 141 to be micronized. On the other hand, the air passing through liquid micronization chamber 133 moves to the outer peripheral portion of first eliminator 141 while containing the water crushed (micronized) by first eliminator 141 as in an air flow indicated by solid arrows in FIG. 5. During the air flowing in the air passage from first eliminator 141 to second eliminator 142, a vortex of air flow is generated, and water and air are mixed. The air containing water then passes through second eliminator 142. As a result, humidification apparatus 116 can humidify the air sucked from suction port 131 and blow out the humidified air from blow-out port 132.

Note that the liquid to be micronized may be other than water, and may be, for example, a liquid such as hypochlorous acid water having bactericidal properties or deodorization properties.

Figure 6:
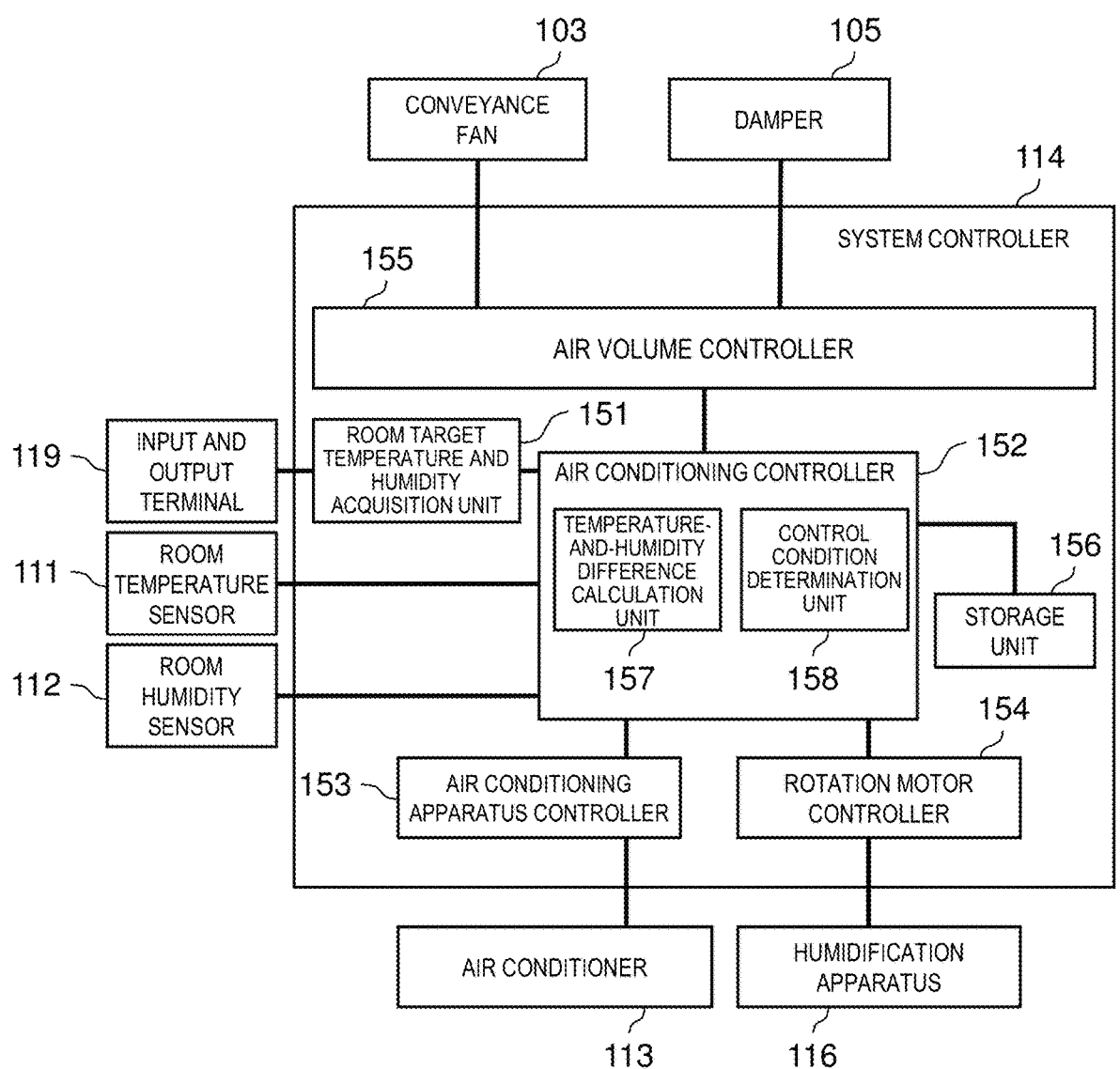
FIG. 6 is a schematic functional block diagram of a system controller of the air conditioning system.

Next, functions of system controller 114 will be described with reference to FIG. 6. FIG. 6 is a schematic functional block diagram of system controller 114 of air conditioning system 120.

System controller 114 includes, as illustrated in FIG. 6, room target temperature and humidity acquisition unit 151, air conditioning controller 152, air conditioning apparatus controller 153, rotation motor controller 154, air volume controller 155, and storage unit 156.

Room target temperature and humidity acquisition unit 151 acquires a room target temperature and room target humidity (hereinafter, also referred to as room target temperature and humidity) which are commonly set in all rooms 102 through input and output terminal 119. The room target temperature is set as a predetermined temperature range defined by a lowest temperature as a lower limit and a highest temperature as an upper limit. The room target humidity is set as a predetermined humidity range defined by lowest humidity as a lower limit and highest humidity as an upper limit. Here, the temperature higher than or equal to the room target temperature means a temperature higher than or equal to the highest temperature as the upper limit, and the temperature lower than the room target temperature means a temperature lower than the lowest temperature as the lower limit. The same applies to the room target humidity. In the present exemplary embodiment, the room target temperature and the room target humidity can be set by the user, but they may be set as fixed values in air conditioning system 120 in advance. The highest temperature, the lowest temperature, the highest humidity, and the lowest humidity acquired by room target temperature and humidity acquisition unit 151 or set in advance are stored in storage unit 156.

Air conditioning controller 152 includes temperature-and-humidity difference calculation unit 157 and control condition determination unit 158.

Temperature-and-humidity difference calculation unit 157 calculates, for rooms 102, differences (temperature differences) between the room target temperature acquired by room target temperature and humidity acquisition unit 151 or is set in advance and the room temperatures acquired by room temperature sensors 111. Further, temperature-and-humidity difference calculation unit 157 calculates, for rooms 102, differences (humidity differences) between the room target humidity acquired by room target temperature and humidity acquisition unit 151 or set in advance and the room humidity acquired by room humidity sensors 112.

Control condition determination unit 158 determines control conditions for air conditioner 113, humidification apparatus 116, conveyance fans 103, and dampers 105 based on the temperature differences and the humidity differences calculated for respective rooms 102 by temperature-and-humidity difference calculation unit 157.

That is, air conditioning controller 152 determines outputs from air conditioner 113, humidification apparatus 116, conveyance fans 103, and dampers 105 based on information regarding the temperature differences and the humidity differences obtained from the information regarding the room target temperature and humidity from room target temperature and humidity acquisition unit 151 and information regarding the room temperature and humidity from the respective sensors (room temperature sensors 111, room humidity sensors 112).

Air conditioning apparatus controller 153 controls an operation mode, a blowing-out temperature, and an air blowing amount of air conditioner 113 in air conditioning room 118 based on the control method determined by air conditioning controller 152.

Rotation motor controller 154 controls the rotation speed of rotation motor 134 provided in humidification apparatus 116 to control the humidification amount of humidification apparatus 116 provided in air conditioning room 118 based on the control conditions determined by air conditioning controller 152.

Air volume controller 155 controls the air blowing amounts of conveyance fans 103 disposed for corresponding rooms 102 and the opening degrees of dampers 105 disposed for corresponding rooms 102, based on the control conditions determined by air conditioning controller 152.

Storage unit 156 is a so-called memory that stores a predetermined temperature range acquired by room target temperature and humidity acquisition unit 151 or set in advance, that is, the highest temperature and the lowest temperature, and a humidity range, that is, the highest humidity and the lowest humidity. Storage unit 156 is also used when storing of information such as numerical values is necessary for control by system controller 114.

Figure 7:
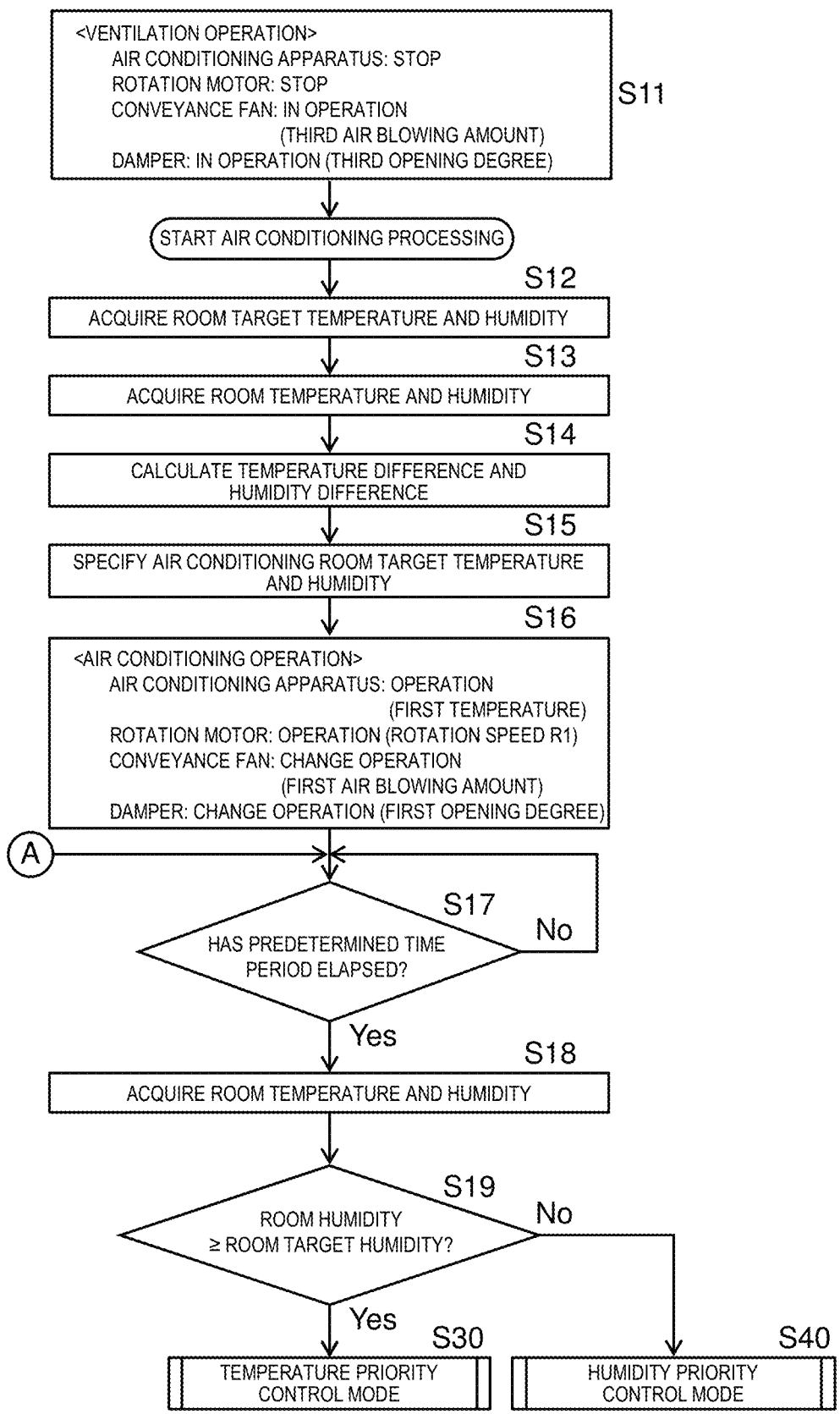
FIG. 7 is a flowchart illustrating air conditioning processing.
Figure 8:
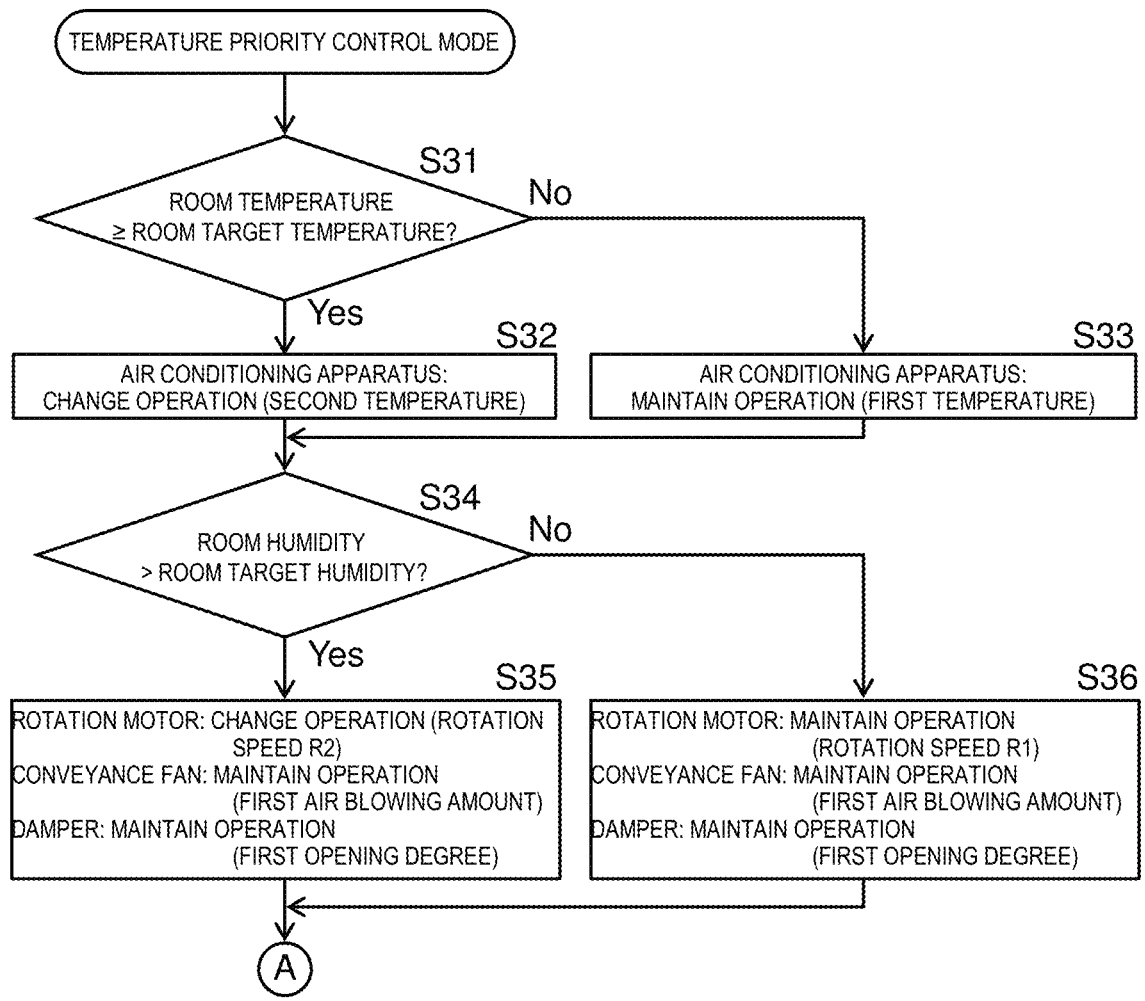
FIG. 8 is a flowchart illustrating a procedure of the air conditioning processing in a temperature priority control mode.
Figure 9:
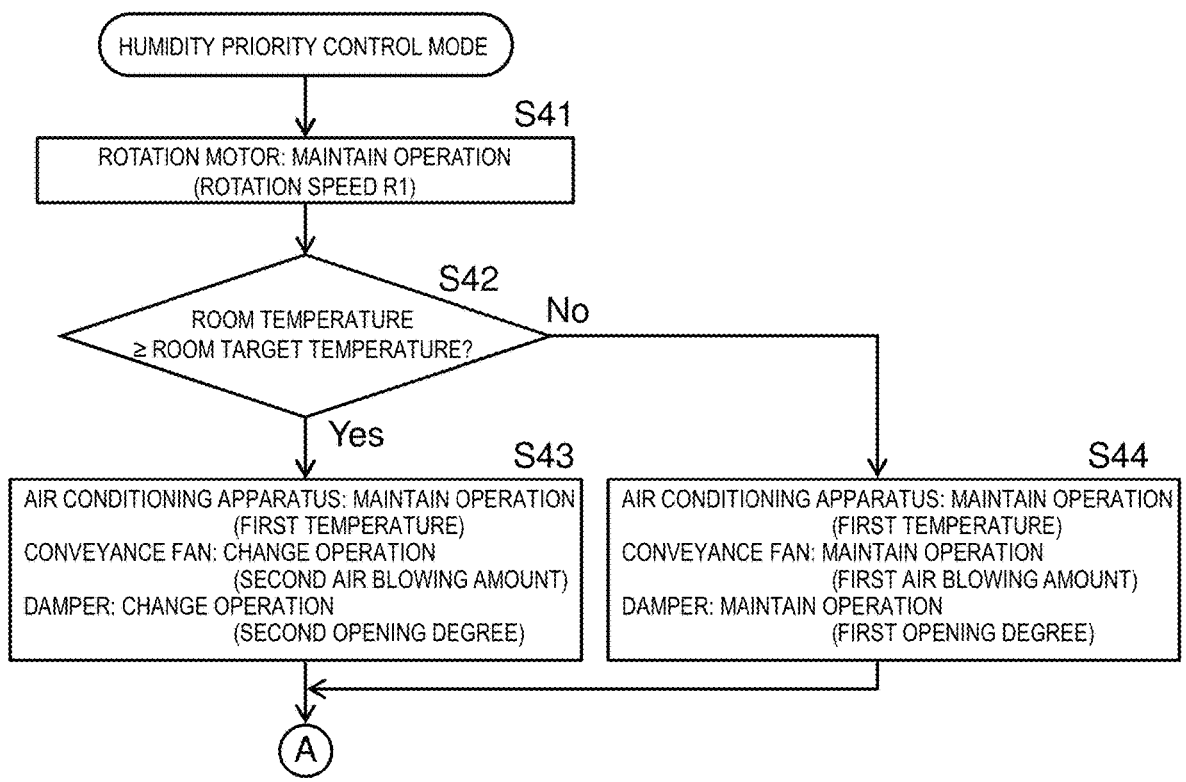
FIG. 9 is a flowchart illustrating a procedure of the air conditioning processing in a humidity priority control mode.

Next, air conditioning processing to be performed by system controller 114 will be described with reference to FIGS. 7 to 9. FIG. 7 is a flowchart illustrating a procedure of the air conditioning processing. FIG. 8 is a flowchart illustrating a procedure of the processing in a temperature priority control mode in the air conditioning processing. FIG. 9 is a flowchart illustrating a procedure of the processing in a humidity priority control mode in the air conditioning processing. Here, since air conditioning processing in winter in Japan is assumed, in air conditioning system 120, air conditioner 113 performs humidification using humidification apparatus 116 while increasing the temperatures of the air in rooms 102.

In air conditioning system 120, as in a general entire-building air conditioning system, heat-exchange ventilation fan 104 performs a constant ventilation operation, and even when air conditioning processing is not performed, conveyance fans 103 are set to a third air blowing amount, and dampers 105 are set to a third opening degree to blow air (step S11). Here, the third air blowing amount is an air volume that satisfies a required ventilation volume defined by the law in a residence, and the air supplied into air conditioning room 118 by heat-exchange ventilation fan 104 is conveyed to rooms 102 by conveyance fans 103. The third opening degree is set to, for example, a full open state. When only the heat-exchange ventilation fan 104 is in operation, air conditioner 113 and humidification apparatus 116 are not in operation.

When the user performs the air conditioning processing, first, system controller 114 acquires the room target temperature and humidity (the room target temperature and the room target humidity) set by input and output terminal 119 and stores the acquired room target temperature and humidity in storage unit 156 (step S12). Here, the room target temperature and humidity is temperature and humidity that the user feels comfortable, and is temperature and humidity common to all rooms.

Upon acquiring the room target temperature and humidity, air conditioning controller 152 acquires information regarding the room temperature and humidity from room temperature sensors 111 and room humidity sensors 112 installed in rooms 102 respectively (step S13). Subsequently, air conditioning controller 152 calculates a temperature difference and a humidity difference with respect to the targets based on the acquired information regarding the room target temperature and humidity and the acquired information regarding the room temperature and humidity, respectively, using temperature-and-humidity difference calculation unit 157 (step S14).

Then, control condition determination unit 158 specifies the air conditioning room target temperature and humidity (the air conditioning room target temperature and the air conditioning room target humidity) for the air in air conditioning room 118 based on the calculated temperature difference and humidity difference (step S15). Here, the air conditioning room target temperature is set to a first temperature that is higher than the room target temperature. Here, the air conditioning room target humidity is set to first humidity that is higher than the room target humidity.

Then, air conditioning controller 152 determines control conditions for air conditioner 113, humidification apparatus 116, conveyance fans 103, and dampers 105 based on the specified air conditioning room target temperature and humidity, and performs control (step S16).

Specifically, air conditioning apparatus controller 153 starts the operation of air conditioner 113 based on the control condition from air conditioning controller 152, and performs the temperature adjustment such that the temperature of the air in air conditioning room 118 becomes the air conditioning room target temperature (first temperature). Rotation motor controller 154 starts the rotation operation of rotation motor 134 based on the control condition from air conditioning controller 152, and rotates the rotation motor 134 at the first rotation speed R1 (2000 rpm to 5000 rpm) so that the humidity of the air in air conditioning room 118 becomes the air conditioning room target humidity (first humidity). Air volume controller 155 changes the air volumes of conveyance fans 103 and the openings degrees of dampers 105 to a first air blowing amount and a first opening degree based on the control conditions from air conditioning controller 152. The first opening degree is set in accordance with temperature differences between the temperatures of the air in rooms 102 and the room target temperatures. For example, when the temperature differences are great, the first opening degree is set to be greater, and when the temperature differences are small, the first opening degree is set to be smaller.

Then, during the air conditioning operation, in a case where a predetermined time period T starting from step (step S16) in which the control conditions are changed has elapsed (Yes in step S17), air conditioning controller 152 acquires new information about the room temperature and humidity from room temperature sensors 111 and room humidity sensors 112 installed in rooms 102 respectively (step S18). On the other hand, when the predetermined time period T has not elapsed (No in step S17), air conditioning controller 152 continues the air conditioning operation under the control conditions as it is (returns to step S17). Here, the predetermined time period T is an acquisition cycle time of the room temperature and humidity in room temperature sensors 111 and room humidity sensors 112, and is set to, for example, 5 minutes.

Next, air conditioning controller 152 determines whether the room humidity in the acquired room temperature and humidity is higher than or equal to the room target humidity (step S19). As a result, when the room humidity is higher than or equal to the room target humidity (Yes in step S19), air conditioning controller 152 shifts the air conditioning operation to a temperature priority control mode M1 (step S30). On the other hand, when the room humidity does not reach the room target humidity (No in step S19), air conditioning controller 152 shifts the air conditioning operation to a humidity priority control mode M2 (step S40).

Here, the temperature priority control mode M1 is a mode in which the temperature adjustment is controlled by air conditioner 113 without being affected by the humidity adjustment control by humidification apparatus 116. Here, the humidity priority control mode M2 is a mode in which the temperature adjustment is controlled by air conditioner 113 with it being affected by the humidity adjustment control by humidification apparatus 116.

In the temperature priority control mode M1, air conditioning controller 152 then determines whether the room temperature in the acquired room temperature and humidity is higher than or equal to the room target temperature (step S31). As a result, when the room temperature is higher than or equal to the room target temperature (Yes in step S31), air conditioning controller 152 changes the control condition of air conditioner 113 to perform the control. Specifically, air conditioning apparatus controller 153 adjusts the temperature based on the new control condition from air conditioning controller 152 such that the temperature of the air in air conditioning room 118 becomes new air conditioning room target temperature (second temperature) (step S32). Next step S34 is then executed.

Here, the second temperature is lower than the first temperature. The second temperature is preferably a temperature necessary for maintaining the room temperature within the room target range. The first temperature is changed to the second temperature by, for example, stopping the temperature adjustment operation of air conditioner 113.

On the other hand, if the room temperature is not higher than or equal to the room target temperature (No in step S31), air conditioning controller 152 does not change the control condition of air conditioner 113, and air conditioning apparatus controller 153 causes air conditioner 113 to maintain and perform the operation for adjusting the temperature to the first temperature (step S33). Next step S34 is then executed.

Thereafter, air conditioning controller 152 determines in step S34 whether the room humidity in the acquired room temperature and humidity exceeds the room target humidity. As a result, when the room humidity exceeds the room target humidity (Yes in step S34), air conditioning controller 152 changes the control condition of humidification apparatus 116 to cause humidification apparatus 116 to perform the control. Specifically, rotation motor controller 154 changes the rotation operation of rotation motor 134 based on the new control condition from air conditioning controller 152, and rotates rotation motor 134 at the second rotation speed R2 (0 rpm to 2000 rpm) so that the humidity of the air in air conditioning room 118 becomes new air conditioning room target humidity (second humidity). Air volume controller 155 maintains the air volumes of conveyance fans 103 and the opening degrees of dampers 105 at the first air blowing amount and the first opening degree based on the control conditions from air conditioning controller 152 (step S35). The processing then returns to step S17. In step S17, the predetermined time period T is measured with the step (step S35) in which the control conditions are changed being a starting point.

On the other hand, if the room humidity does not exceed the room target humidity (No in step S34), air conditioning controller 152 does not change the control condition of humidification apparatus 116, and rotation motor controller 154 maintains the rotation operation (first rotation speed R1) of rotation motor 134. Air volume controller 155 maintains the air volumes of conveyance fans 103 and the opening degrees of dampers 105 at the first air blowing amount and the first opening degree (step S36). The processing then returns to step S17. In step S17, the predetermined time period T is measured with the step (step S36) in which the control conditions are changed being a starting point.

In the temperature priority control mode M1, the air-conditioning operation is performed as described above.

Next, in the humidity priority control mode M2, the control condition of humidification apparatus 116 is not changed based on the determination in step S19, and the operation for adjusting the humidity to the first humidity is maintained and performed. Specifically, rotation motor controller 154 rotates rotation motor 134 at the first rotation speed R1 (2000 rpm to 5000 rpm) without changing the rotation operation of rotation motor 134 so that the humidity of the air in air conditioning room 118 becomes the first humidity (step S41).

Next, air conditioning controller 152 determines in step S18 whether the room temperature in the acquired room temperature and humidity is higher than or equal to the room target temperature (step S42). As a result, if the room temperature is higher than or equal to the room target temperature (Yes in step S42), air conditioning controller 152 does not change the control condition of air conditioner 113, and air conditioning apparatus controller 153 causes air conditioner 113 to maintain and perform the operation for adjusting the temperature to the first temperature. Air volume controller 155 changes the air volumes of conveyance fans 103 and the opening degrees of dampers 105 to the second air blowing amount and the second opening degree (step S43). Note that the processing in steps S42 and S44 is also referred to as "second control".

Here, the second air blowing amount is less than the first air blowing amount. As a result, the air temperature-adjusted to the first temperature in air-conditioning room 118 is less likely to be discharged to outside air conditioning room 118, and thus the humidification amount of the air in air conditioning room 118 can be increased. Like the first opening degree, the second opening degree is set in accordance with the temperature differences between the temperatures of the air in rooms 102 and the room target temperature. For example, when the temperature differences are great, the second opening degree is set to be greater, and when the temperature differences are small, the second opening degree is set to be smaller. The processing then returns to step S17. In step S17, the predetermined time period T is measured with the step (step S43) in which the control conditions are changed being a starting point.

On the other hand, if the room temperature is not higher than or equal to the room target temperature (No in step S42), air conditioning controller 152 does not change the control condition of air conditioner 113, and air conditioning apparatus controller 153 causes air conditioner 113 to maintain and perform the operation for adjusting the temperature to the first temperature. Air volume controller 155 maintains the air volumes of conveyance fans 103 and the opening degrees of dampers 105 at the first air blowing amounts and the first opening degrees. The processing then returns to step S17. In step S17, the predetermined time period T is measured with the step (step S44) in which the control conditions are changed being as a starting point.

In the humidity priority control mode M2, the air conditioning operation is performed as described above.

Air conditioning system 120 according to the present exemplary embodiment performs control such that the room temperature and humidity in rooms 102 reaches the room target temperature and humidity by the series of the processing described above.

Temperature adjustment of air conditioning system 120 may be controlled as in the conventional entire-building air conditioning system. In such a case, when the room temperatures in rooms 102 reach the room target (room target temperature) earlier than room humidity, air conditioner 113 is stopped or the heating amount is reduced in order to avoid unnecessary energy consumption. As a result, the temperature of the air in air conditioning room 118 decreases from the first temperature. In the present exemplary embodiment, such a situation where the temperature decreases means that air conditioner 113 adjusts the temperature to the second temperature lower than the first temperature. As a result, in the humidification apparatus, the humidification amount of the air in air conditioning room decreases, and the time period until the humidity of the air in rooms 102 reaches the room target humidity becomes long.

On the other hand, in air conditioning system 120 according to the present exemplary embodiment, even if the room temperatures in rooms 102 reach the room target (room target temperature) earlier than the room humidity, air conditioner 113 is not stopped or the heating amount is not reduced. That is, the temperature adjustment is not controlled, and the temperature adjustment is maintained at the first temperature. As a result, a decrease in the humidification amount of the air in air conditioning room 118 can be prevented, and the humidity of the air in air conditioning room 118 can be efficiently made to reach the room target humidity.

Air conditioning system 120 according to the second exemplary embodiment described above can produce the following effects.

(1) In air conditioning system 120, in order to adjust the temperatures of the air in rooms 102 to the room target temperature, air conditioner 113 controls the temperature adjustment using the air in air conditioning room 118 whose temperature has risen to the first temperature (air conditioning room target temperature) that is higher than the room target temperature. At that time, in a case where the humidity of the air in rooms 102 is higher than or equal to the room target humidity, air conditioner 113 performs first control in which the air in air conditioning room 118 is adjusted to second temperature lower than the first temperature when the temperatures of the air in rooms 102 rise to reach the room target temperature. In a case where the humidity of the air in rooms 102 is lower than the room target humidity (not higher than or equal to the room target humidity), air conditioner 113 performs the second control in which the temperature of the air in air conditioning room 118 is maintained at the first temperature when the temperatures of the air in rooms 102 rise to reach the room target temperature.

As a result, the air conditioner 113 controls the temperature adjustment (the first control or the second control) in conjunction with the humidification control by humidification apparatus 116. This can prevent a decrease in the humidification capacity (humidification amount) of humidification apparatus 116 due to the temperature adjustment control by air conditioner 113, thereby stabilizing the humidification performance of air conditioning system 120. That is, since the air heated to the first temperature by air conditioner 113 is continuously introduced into humidification apparatus 116, the humidification amount of the air in air conditioning room 118 can be increased as compared with the conventional air conditioning system, and the humidity of the air in air conditioning room 118 can efficiently reach the air conditioning room target humidity. This result in providing air conditioning system 120 capable of efficiently performing temperature adjustment and humidity adjustment in rooms 102.

(2) Air conditioning system 120 is configured so that in a case where the second control is performed, the air blowing amount of air to be conveyed to the indoor space by conveyance fans 103 is reduced from the first air blowing amount set when the temperatures of the air in rooms 102 reach the room target temperature to the second air blowing amount that is less than the first air blowing amount. As a result, in the second control, since the amounts of air conveyed to rooms 102 by conveyance fans 103 reduce, humidification apparatus 116 can perform the humidification control towards the room target humidity while controlling a phenomenon that a rise in the temperature of the air in rooms 102 due to maintaining the temperature of the air in air conditioning room 118 at the first temperature (the phenomenon that the temperatures of the air in rooms 102 become higher than the room target temperature).

(3) Air conditioning system 120 is configured to include room temperature sensors 111 and room humidity sensors 112 acquire temperatures and humidity of air in rooms 102 and transmit the acquired temperatures and humidity to system controller 114, and so that system controller 114 causes air conditioner 113 to control temperature adjustment for adjusting the temperature of the air in rooms 102 to a room target temperature, and causes humidification apparatus 116 to control humidity adjustment for humidifying the humidity of the air in rooms 102 to room target humidity, based on information about the room temperatures and the room humidity from room temperature sensors 111 and room humidity sensors 112. As a result, air conditioner 113 can control the temperature adjustment and humidification apparatus 116 can control the humidity adjustment concomitantly with the change in temperature and humidity of the air in rooms 102, thereby improving the comfort in the indoor space.

(4) Air conditioning system 120 is configured so that humidification apparatus 116 includes centrifugal fan 136 that introduces the air temperature-adjusted by air conditioner 113 into the apparatus, and humidification portion (liquid micronization chamber 133) that makes the air introduced by centrifugal fan 136 contain water micronized by centrifugal crushing and discharges the water. As a result, since the air is introduced into humidification apparatus 116 by centrifugal fan 136, the humidification amount of the air in air conditioning room 118 can be adjusted without depending on the volume of air conveyed from air conditioning room 118 by conveyance fans 103.

Although the present disclosure has been described above based on the exemplary embodiment, the present disclosure is not limited to the above exemplary embodiment at all, and it can be easily inferred that various modifications and variations can be made without departing from the gist of the present disclosure. For example, the numerical values mentioned in the above exemplary embodiment are merely examples, and other numerical values can be naturally used.

In air conditioning system 120 according to the present exemplary embodiment, in order to adjust the temperature of the air in rooms 102 to the room target temperature, air conditioner 113 controls temperature adjustment using the air in air conditioning room 118 whose temperature has risen to the first temperature (air conditioning room target temperature) that is higher than the room target temperature, but the present disclosure is not limited to this. For example, system controller 114 may control the air conditioning room target temperature and humidity (particularly, the air conditioning room target temperature) to match the room target temperature and humidity (particularly, the room target temperature). This also achieves similar effects.

Further, in air conditioning system 120 according to the present exemplary embodiment, an air conditioning room temperature sensor that detects the temperature of the air in air conditioning room 118 and an air conditioning room humidity sensor that detects the humidity of the air in air conditioning room 118 may be provided in air conditioning room 118. Accordingly, temperature adjustment and humidity adjustment can be controlled with higher accuracy in order to set the temperature and humidity in air conditioning room 118 to the set air conditioning room temperature and humidity.

Further, in air conditioning system 120 according to the present exemplary embodiment, even if the room temperatures in rooms 102 reach the room target (room target temperature) earlier than the room humidity, the temperature adjustment at the first temperature is maintained without controlling the temperature adjustment such as stopping air conditioner 113 or decreasing the heating amount. However, when the room temperature exceeds the maximum temperature as the upper limit of the room target temperature, it is preferable to control the temperature adjustment such as stopping air conditioner 113 or reducing the heating amount (control the temperature adjustment of the air in air conditioning room 118 to the second temperature lower than the first temperature). This makes it possible to prevent a decrease in comfort in the indoor space.

In the above exemplary embodiment, a room is used, but the room may not have a person, and can be regarded as one space. That is, when a corridor or a kitchen is partitioned to some extent, the corridor and the kitchen can be regarded as one space, and corresponds to one room.

Further, air conditioning system 120 according to the present exemplary embodiment is applicable to one-unit housing or multiunit housing such as an apartment. In a case where air conditioning system 120 is applied to multiunit housing, one system corresponds to a residence unit, and each residence is not one room.

INDUSTRIAL APPLICABILITY

The air conditioning system of the present disclosure is useful as an air conditioning system using a humidification apparatus that contributes to downsizing of an air conditioning room.

REFERENCE MARKS IN THE DRAWINGS 1, 101: general residence
2, 2a, 2b, 2c, 2d, 102, 102a, 102b, 102c, 102d: room
3, 3a, 3b, 103, 103a, 103b: conveyance fan
4, 104: heat-exchange ventilation fan
5, 5a, 5b, 105, 105a, 105b: damper
6, 6a, 6b, 6c, 6d, 106, 106a, 106b, 106c, 106d: circulation port
7, 7a, 7b, 7c, 7d, 107, 107a, 107b, 107c, 107d: room exhaust port
8, 8a, 8b, 8c, 8d, 108, 108a, 108b, 108c, 108d: room air supply port
11, 11a, 11b, 11c, 11d, 111, 111a, 111b, 111c, 111d: room temperature sensor
12, 12a, 12b, 12c, 12d, 112, 112a, 112b, 112c, 112d: room humidity sensor
13, 113: air conditioner
14, 114: system controller
16, 116: humidification apparatus
17, 117: dust collecting filter
18, 118: air conditioning room
19, 119: input and output terminal
20, 120: air conditioning system
31, 131: suction port
31a: suction port
32, 132: blow-out port
33, 133: liquid micronization chamber
34, 134: rotation motor
35, 135: rotation shaft
35a: housing pipe
36, 136: centrifugal fan
36a: fixed blade
37, 137: pumping pipe
38, 138: rotating plat
39, 139: opening
40, 140: water storage portion
41, 141: first eliminator
42, 142: second eliminator
151: room target temperature and humidity acquisition unit
152: air conditioning controller
153: air conditioning apparatus controller
154: rotation motor controller
155: air volume controller
156: storage unit
157: temperature-and-humidity difference calculation unit
158: control condition determination unit

The invention claimed is:

1. An air conditioning system comprising:

an air conditioning room configured to introduce air from outside;

an air conditioning apparatus being installed in the air conditioning room, the air conditioning apparatus configured to adjust a temperature of the air in the air conditioning room;

a humidification apparatus being installed in the air conditioning room, the humidification apparatus configured to humidify the air temperature-adjusted by the air conditioning apparatus; and a plurality of conveyance fans configured to convey the air in the air conditioning room to a respective one of a plurality of indoor spaces independent of the air conditioning room, wherein the humidification apparatus includes a rotation shaft configured to be rotated by a rotation motor, a centrifugal fan configured to rotate together with the rotation shaft to introduce the air temperature-adjusted by the air conditioning apparatus into the humidification apparatus, the centrifugal fan being fixed to the rotation shaft, a pumping pipe having a cylindrical shape configured to rotate together with the rotation shaft to pump water from a pumping port and discharge the pumped water in a centrifugal direction, the pumping pipe being fixed to the rotation shaft, the pumping port being provided on a vertically lower side of the pumping pipe, an eliminator configured to micronize the water discharged from the pumping pipe by collision of the water and collect a part of micronized water droplets, a water storage portion configured to store the water pumped from the pumping port, the water storage portion being provided vertically below the pumping pipe, wherein the pumping pipe includes a plurality of rotating plates arranged at predetermined intervals in an axial direction of the rotation shaft, and the plurality of rotating plates protruding in the centrifugal direction from an outer peripheral surface of the pumping pipe, and wherein the centrifugal fan is disposed to overlap the plurality of rotating plates vertically above the plurality of rotating plates, and includes, between a pair of upper and lower discs, a fixed blade protruding in an outward direction from an outer surface of the pumping pipe.

2. The air conditioning system according to claim 1, wherein the centrifugal fan is configured to have a same outer diameter as an outer diameter of the plurality of rotating plates.

3. The air conditioning system according to claim 1, wherein in the humidification apparatus, the air introduced into the humidification apparatus from above in a vertical direction flows through the centrifugal fan to be blown out in the centrifugal direction towards the eliminator.

4. The air conditioning system according to claim 3, wherein the eliminator includes a first eliminator through which the air blown out from the centrifugal fan flows in the centrifugal direction, and a second eliminator through which the air flowing through the first eliminator flows vertically upward.

* * * * *